US012566715B2

(12) United States Patent
Grisenthwaite et al.

(10) Patent No.: US 12,566,715 B2
(45) Date of Patent: Mar. 3, 2026

(54) TRANSLATION TABLE ADDRESS STORAGE CIRCUITRY

(71) Applicant: ARM LIMITED, Cambridge (GB)

(72) Inventors: Richard Roy Grisenthwaite, Cambridge (GB); Jason Parker, Sheffield (GB); Mark Salling Rutland, Cambridge (GB); Yuval Elad, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/998,744

(22) PCT Filed: May 14, 2021

(86) PCT No.: PCT/GB2021/051174
§ 371 (c)(1),
(2) Date: Nov. 14, 2022

(87) PCT Pub. No.: WO2021/234351
PCT Pub. Date: Nov. 25, 2021

(65) Prior Publication Data
US 2023/0342303 A1 Oct. 26, 2023

(30) Foreign Application Priority Data
May 19, 2020 (GB) ...................................... 2007437

(51) Int. Cl.
G06F 12/1045 (2016.01)
G06F 12/02 (2006.01)
(Continued)

(52) U.S. Cl.
CPC .......... G06F 12/1045 (2013.01); G06F 12/14 (2013.01); *G06F 2212/1052* (2013.01)

(58) Field of Classification Search
CPC ................. G06F 12/1045; G06F 12/14; G06F 2212/1052
(Continued)

(56) References Cited

U.S. PATENT DOCUMENTS

2004/0148480 A1 * 7/2004 Watt .................... G06F 12/1009
711/163
2009/0320048 A1 12/2009 Watt et al.
(Continued)

FOREIGN PATENT DOCUMENTS

JP 2006-506753 2/2006
JP 2016-527652 9/2016
(Continued)

OTHER PUBLICATIONS

Combined Search and Examination Report for GB Application No. 2007437.3 dated Feb. 18, 2021, 9 pages.
(Continued)

*Primary Examiner* — Arpan P. Savla
*Assistant Examiner* — Sidney Li
(74) *Attorney, Agent, or Firm* — NIXON & VANDERHYE P.C.

(57) ABSTRACT

An apparatus has address translation circuitry to translate a target virtual address (VA) specified by a memory access request into a target physical address, first/second translation table address storage circuitry to store first/second translation table addresses; and protected region defining data storage circuitry to store region defining data specifying at least one protected region of virtual address space. In response to the memory access request: when the target VA is in the protected region(s), the address translation circuitry translates the target VA based on address translation data from a first translation table structure identified by the first translation table address. When the target VA is outside the (Continued)

protected region(s), the target VA is translated based on address translation data from a second translation table structure identified by the second translation table address.

18 Claims, 13 Drawing Sheets

(51) Int. Cl.
G06F 12/1009 (2016.01)
G06F 12/1027 (2016.01)
G06F 12/14 (2006.01)

(58) Field of Classification Search
USPC ........................................ 711/163
See application file for complete search history.

(56) References Cited

U.S. PATENT DOCUMENTS

| | | | | |
|---|---|---|---|---|
| 2013/0275701 | A1* | 10/2013 | Symes | G06F 12/145 |
| | | | | 711/163 |
| 2021/0141643 | A1* | 5/2021 | Horsnell | G06F 9/3842 |

FOREIGN PATENT DOCUMENTS

| | | |
|---|---|---|
| KR | 10-2005-0085015 | 8/2005 |
| WO | 2004/046738 | 6/2004 |

OTHER PUBLICATIONS

International Search Report and Written Opinion of the International Searching Authority for PCT/GB2021/051174 mailed Aug. 18, 2021, 13 pages.
Robert Bedichek, "Some Efficient Architecture Simulation Techniques," Proceedings of the Winter 1990 USENIX Conference, Jan. 22-26, 1990, 12 pages.
Arm Limited, "ARM Security Technology, Building a Secure System using TrustZone® Technology" Apr. 2009, 108 pages.
Arm Limited, "TrustZone® Address Space Controller (TZC-280)" Revision: r0p0, Technical Reference Manual, Mar. 19, 2010, 82 pages.
Office Action for JP Application No. 2022-568376 dated Mar. 6, 2025 and English translation, 6 pages.
Office Action for KR Application No. 10-2022-7044136 issued Dec. 30, 2025 and English translation, 14 pages.

* cited by examiner

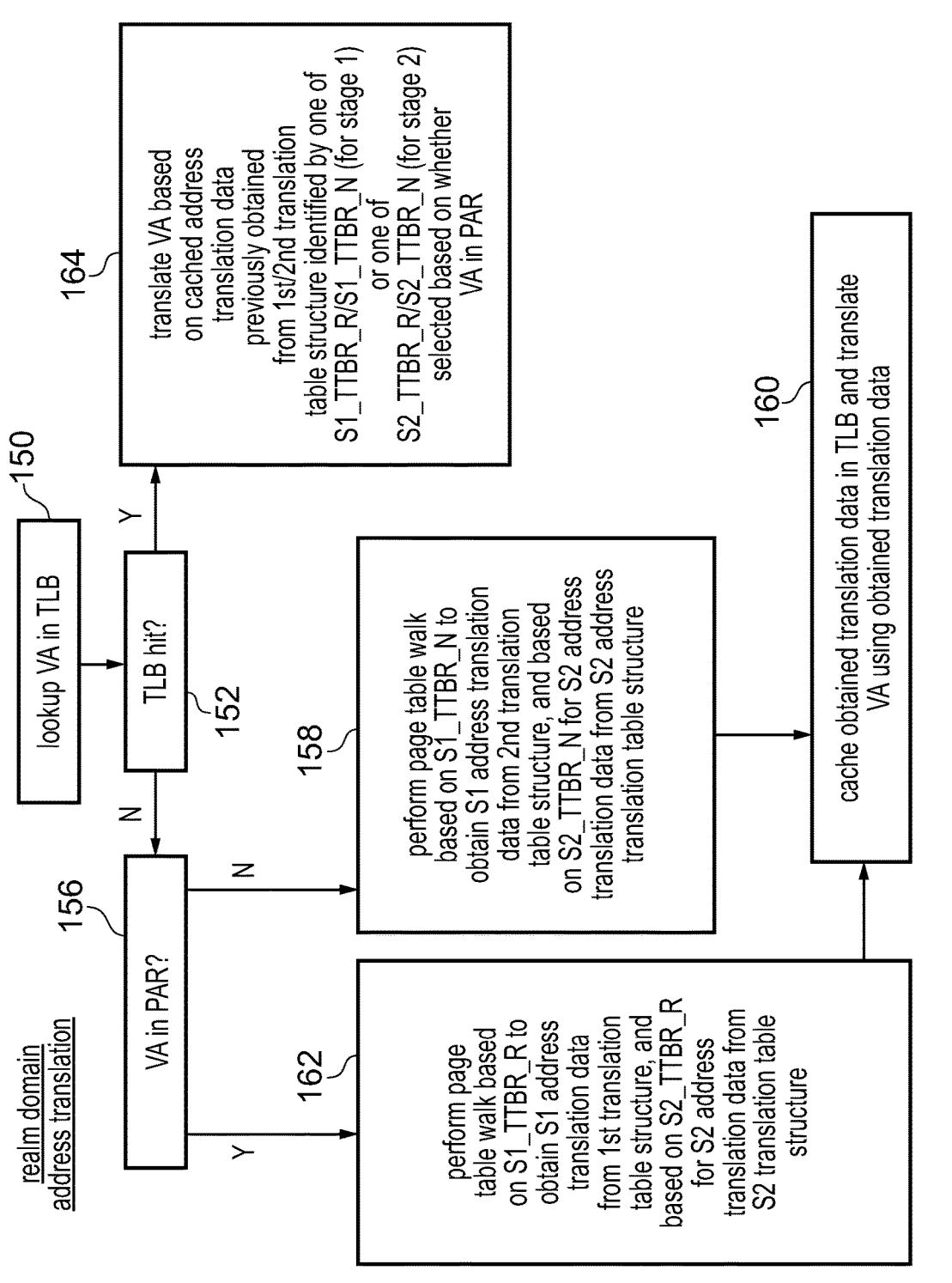

realm domain
address translation lookup VA in TLB    150

TLB hit?    152

VA in PAR?    156

164    translate VA based on cached address translation data previously obtained from 1st/2nd translation table structure identified by one of S1_TTBR_R/S1_TTBR_N (for stage 1) or one of S2_TTBR_R/S2_TTBR_N (for stage 2) selected based on whether VA in PAR 158    perform page table walk based on S1_TTBR_N to obtain S1 address translation data from 2nd translation table structure, and based on S2_TTBR_N for S2 address translation data from S2 address translation table structure 162    perform page table walk based on S1_TTBR_R to obtain S1 address translation data from 1st translation table structure, and based on S2_TTBR_R for S2 address translation data from S2 translation table structure 160    cache obtained translation data in TLB and translate VA using obtained translation data

FIG. 8

TRANSLATION TABLE ADDRESS STORAGE CIRCUITRY

The present technique relates to the field of data processing. More particularly, it relates to address translation.

A data processing apparatus may have address translation circuitry to translate a target virtual address specified by a memory access request into a target physical address. The address translation could be performed in one stage direct from the virtual address to the physical address, or as a two-stage address translation based on a stage 1 translation table structure used to map the virtual address to an intermediate address and a stage 2 translation table structure used to map the intermediate address to a physical address. Translation table address storage circuitry may store a translation table address identifying the translation table structure to use for the address mapping.

At least some examples provide an apparatus comprising: address translation circuitry to translate a target virtual address specified by a memory access request into a target physical address; first translation table address storage circuitry to store a first translation table address; second translation table address storage circuitry to store a second translation table address; and protected region defining data storage circuitry to store region defining data specifying at least one protected region of virtual address space; in which: in response to the memory access request, the address translation circuitry is configured to: when the target virtual address is in the at least one protected region, translate the target virtual address based on address translation data from a first translation table structure identified by the first translation table address stored in the first translation table address storage circuitry; and when the target virtual address is outside the at least one protected region, translate the target virtual address based on address translation data from a second translation table structure identified by the second translation table address stored in the second translation table address storage circuitry.

At least some examples provide a method comprising: in response to a memory access request specifying a target virtual address: when the target virtual address is in at least one protected region specified by region defining data stored in protected region defining data storage circuitry, translating the target virtual address based on address translation data from a first translation table structure identified by a first translation table address stored in first translation table address storage circuitry; and when the target virtual address is outside the at least one protected region, translating the target virtual address based on address translation data from a second translation table structure identified by a second translation table address stored in second translation table address storage circuitry.

At least some examples provide a computer program for controlling a host data processing apparatus to provide an instruction execution environment for execution of target code; the computer program comprising: address translation program logic to translate a target virtual address specified by a memory access request into a target physical address; and state emulating logic to maintain state information emulating architectural state of a target instruction set architecture associated with the target code, the state information specifying: a first translation table address; a second translation table address; and region defining data specifying at least one protected region of simulated virtual address space; in which: in response to a memory access instruction of the target code, the address translation program logic is configured to: when the target virtual address is in the at least one protected region, translate the target virtual address based on address translation data from a first translation table structure identified by the first translation table address; and when the target virtual address is outside the at least one protected region, translate the target virtual address based on address translation data from a second translation table structure identified by the second translation table address.

A computer-readable storage medium may store the computer program described above. The storage medium may be a non-transitory storage medium.

BRIEF DESCRIPTION OF THE DRAWINGS

Further aspects, features and advantages of the present technique will be apparent from the following description of examples, which is to be read in conjunction with the accompanying drawings, in which:

FIG. 8 illustrates a method of controlling address translation in a realm domain;

DETAILED DESCRIPTION

Figure 1:
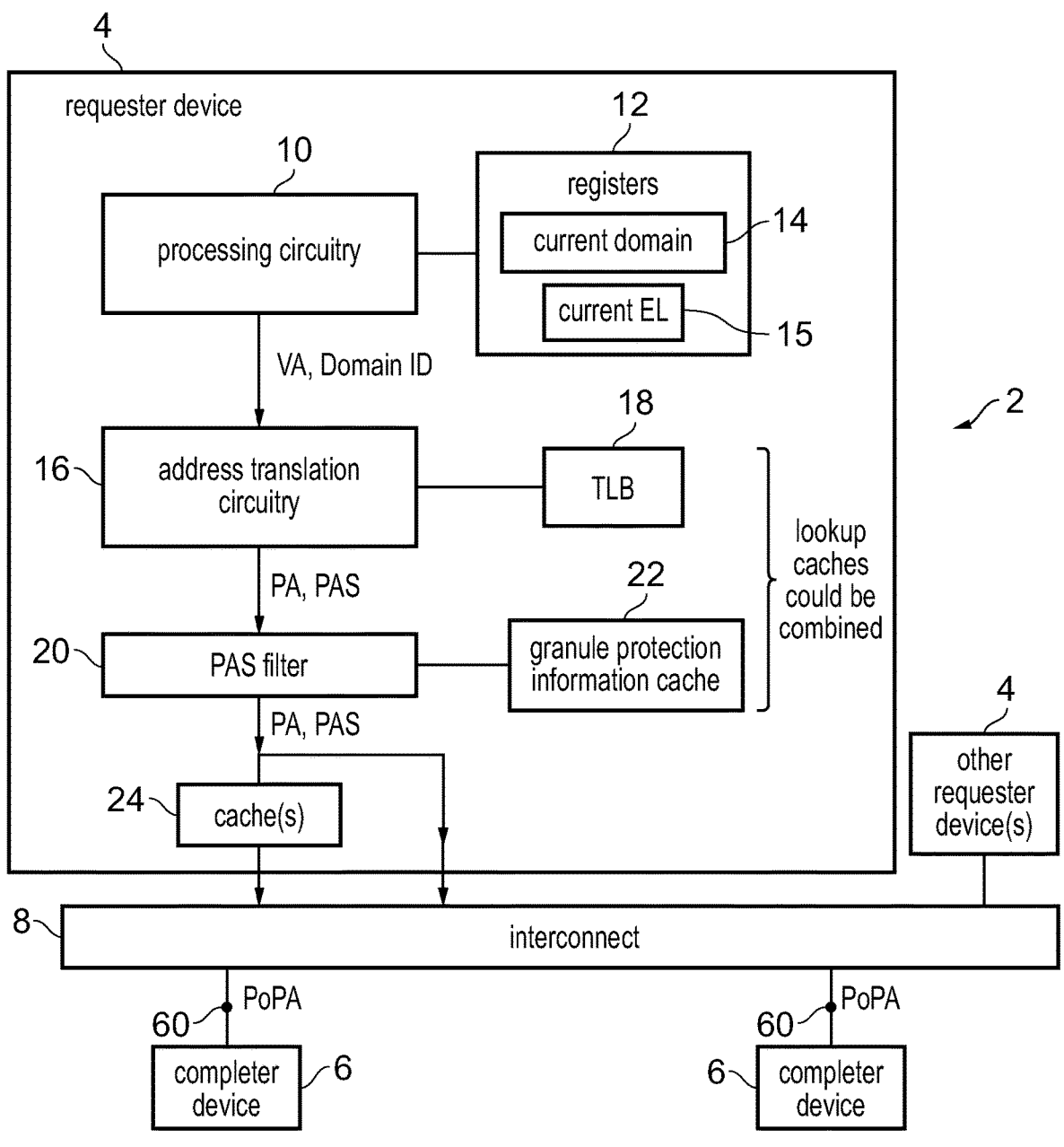
FIG. 1 illustrates an example of a data processing apparatus.

An apparatus has address translation circuitry to translate a target virtual address specified by a memory access request into a target physical address, first and second translation table address storage circuitry (e.g. first and second translation table address registers) to store first and second translation table addresses respectively, and protected region defining data storage circuitry to store region defining data specifying at least one protected region of virtual address space. In response to a memory access request, when the target virtual address is in the at least one protected region, the target virtual address is translated based on address translation data from a first translation table structure identified by the first translation table address stored in the first translation table address storage circuitry. When the target virtual address is outside the at least one protected region, the target virtual address is translated based on address translation data from a second translation table structure identified by the second translation table address stored in the second translation table address storage circuitry.

The inventors recognised that it can be useful to provide first and second translation table address storage, where the address translation circuitry selects which to use for obtaining the address of a translation table structure, based on a comparison between the target virtual address and region defining data stored in protected region defining data storage circuitry. This means that different translation table structures are referenced for addresses within the protected region and outside the protected region respectively. The definition of the protected region is variable based on the region defining data stored in the protected region defining data storage circuitry. This can help to support more efficient development of securely isolated computing environments associated with sandboxed components within a larger application, for example. For such a component, it may be desirable to provide the code executing within the protected region with different translation table data to code of the same application that is located outside that protected region, for example the translation table structure referenced for code inside the protected region could grant access to some regions of the address space not accessible to code outside the protected region. However, the sandboxed component could also need to reference data outside the protected region, which may be shared with less secure code stored at addresses outside the protected region.

While one approach could be to define an address table structure covering the entire virtual address space, dedicated for use by the sandboxed component associated with addresses in the protected region, this approach may incur additional overhead in keeping the translation tables associated with the protected region and the other region of the virtual address space synchronised for those portions of the address space which are shared between the secure and less secure portions of code. For example, this may require entries of the translation table structure used by the less secure code to be copied into translation table structures used by the code within the protected region, or may require that there is co-operation in defining the table structure so that both tables point to the same location for some levels of page tables. This synchronisation of multiple table structures can be difficult to manage in practice (especially in a multi-processor system) since in the use cases where it is desirable to provide a secure component associated with the protected region of virtual address space, the management of the translation table structures used by the secure component and the other code may be handled by different parties, and requiring cooperation between those parties may be considered to be less practical, more costly or at increased risk of loss of security.

With the approach described above, the address translation circuitry selects whether to obtain the translation table address from the first or second translation table address storage circuitry, based on whether the virtual address is inside or outside the protected address region of virtual address space. This means the party managing the translation data to be used for addresses within the protected region does not need to also define translation data for addresses outside the protected region. For addresses outside the protected region, a different translation table is referenced, which could for example be the same translation structure that is used by the code located outside the protected region for those accesses which access data outside the protected region. This can reduce the need to duplicate translation entries, saving memory capacity, and also avoid the time/development cost of cooperation between parties as discussed above. Hence, a processor architecture supporting first and second translation table address storage circuitry, protected region defining data storage circuitry and address translation circuitry as described above can make software development of secure sandboxed components more efficient.

At least one translation lookaside buffer (TLB) may be provided for caching information derived from address translation data from one or translation table structures. In response to a memory access request which misses in the at least one translation lookaside buffer, the address translation circuitry may determine whether the target virtual address of the memory access request is in the at least one protected region of virtual address space specified by the region defining data; and perform a page table walk operation using the first translation table address stored in the first translation table address storage circuitry when the target virtual address is in the at least one protected region, and using the second translation table address stored in the second translation table address storage circuitry when the target virtual address is outside the at least one protected region.

Hence, the selection between the first/second translation table address storage may take place at the time of handling a miss in the TLB when a page table walk operation is required to obtain translation data from memory. On hits in the TLB, there may be no need to check whether the virtual address is in the protected region or not, as the hit may return data previously allocated to the TLB based on the one of the first/second translation table structures selected at the time of handling the corresponding TLB miss.

The processing circuitry may have different domains of operation which may be associated with different access rights or capabilities. For example, in one domain the processing circuitry may be allowed to carry out some actions which are not allowed in another domain or to access certain regions of memory not accessible to another domain.

Not all domains may use the region defining data to decide which translation table address storage circuitry to access. In some implementations, selection of a translation table address based on whether the target virtual address is in the at least one protected region cases may only occur for a subset of the domains and may not occur for other domains not in the subset. Hence, when the processing circuitry is in a first domain, the address translation circuitry may translate the target virtual address using address translation data from one of the first translation table structure and the second translation table structure depending on whether the target virtual address is in the at least one protected region. On the other hand, when the processing circuitry is in the second domain the address translation circuitry may translate the target virtual address based on address translation data from a translation table structure identified by a translation table address obtained from a storage location selected independent of a determination of whether the target virtual address is in or outside the at least one protected region.

In some cases, when the processing circuitry is in the second domain then the address translation circuitry may obtain the translation table address from the second translation table address storage circuitry—i.e. the same storage from which the translation table address would be obtained in the first domain for translating a virtual address outside the protected region. With this approach, accesses from the first domain to addresses outside the protected region by definition use the same translation table that would be used in the second domain, which reduces the amount of translation table data needed to be maintained by code in the first domain as the first domain code can simply reuse the portions of the second domain's translation table structures associated with addresses outside the protected region.

However, another approach could be that further translation table address storage circuitry could be provided to store a further translation table address, so that when the processing circuitry is in the second domain, the address translation circuitry may obtain the translation table address from the further translation table address storage circuitry, which may be different from the second translation table address storage circuitry used within the first domain for accesses outside the at least one protected region. While this approach could still support the code in the first domain accessing the same translation table structure as code in the second domain for accesses within the protected region, this would then require the address in the second translation table address storage circuitry to be set equal to the address in the further translation table address storage circuitry. While this may require some additional overhead in terms of storage circuitry and hardware and software instructions to set the address, this approach does provide added flexibility where the code in the first domain could select whether or not its accesses outside the protected region should reuse the same translation table structure as the code in the second domain or should instead access a completely different structure for its address translation data.

Exception handling circuitry may be provided to control handling of exceptions, Exception could occur due to various causes, e.g. address faults may occur if a memory access to a given virtual address is requested and there is no valid translation table data defined for that address or the translation table data for that address specifies that access is not permitted. Exceptions could also occur due to other causes such as external interrupts, undefined instructions, etc. When an exception occurs, some forms of exceptions may be attributed to certain virtual addresses, for example because the address fault occurred when accessing that virtual address to fetch instructions or access data from memory, or because the exception occurred when processing an instruction associated with that virtual address.

For at least one type of exception which is associated with a given virtual address, the exception handling circuitry may select whether to perform a first exception handling action or a second exception handling action (different to the first exception handling action) depending on whether the exception is associated with a virtual address inside or outside the at least one protected region. It is not necessary to make this determination for all types of exceptions, but at least for some types it can be useful to trigger different handling of the exception when the given virtual address is in the at least one protected region compared to when the given virtual address is outside the at least one protected region. This allows the exception handler for dealing with the exception to take a different response depending on whether the exception was associated with the protected code inside the protected code region or the less protected code outside the protected region.

In one example, the exception handling circuitry could determine whether the exception should be handled in the first domain or the second domain based on whether the given virtual address is inside or outside the at least one protected region. The first/second exception handling actions could be triggering of an exception to be handled in the first/second domain respectively.

Another option could be that the first exception handling action comprises setting syndrome information to indicate that the exception is associated with a virtual address in the at least one protected region, and the second exception handling action comprises setting the syndrome information to indicate that the exception is associated with a virtual address outside the at least one protected region. Syndrome information may be information that is accessible by an exception handler that indicates information about the cause of the exception. The syndrome information can be referenced by the exception handler to determine how to process the exception. With this approach, if the at least one type of exception occurs during processing in the first domain, the exception may be taken in the first domain regardless of whether the exception is associated with a virtual address inside or outside the at least one protected region, but the exception handler executing in the first domain could then use the syndrome information to determine whether to deal with the cause of the exception itself, or to forward the exception for handling in the second domain.

Either way, these features allow the exception handling circuitry to either directly or indirectly cause the exception to be processed in different domains depending on whether the exception is associated with an address inside or outside the at least one protected region. This can be particularly useful for address fault exceptions which are generated if an access to the given virtual address finds that there is no valid translation table data defined in the translation table structure looked up for that access, or that while there is valid translation table data, the translation table data specifies access permissions which denies access for that particular request (e.g. because it is a write access to a read only region of memory, or because the domain or other operating state of the processing circuitry at the time of issuing the request is indicated as not being allowed to access that virtual address). As mentioned above, one use case for the provision of separate translation table address storage for use inside and outside the protected region when in the first domain can be that this can allow the translation table structure associated with the second domain to be reused for those accesses outside the protected region. Hence, for address faults it may be preferred for any exceptions which arise when making an access outside the protected region to be directed (directly by the exception handling circuitry, or indirectly via an exception handler executed in the first domain) to an exception handler processed in the second domain (e.g. associated with an operating system or hypervisor running in the second domain which defines the translation table structures used by the second domain's code), whereas address faults arising in the first domain when accessing a region inside the protected region could be handled instead by the first domain which may be managing a separate translation table structure identified by the address in the first translation table address register.

On the other hand, for the at least one type of exception, if it occurs during processing in the second domain the exception may be handled in the second domain regardless of whether the virtual address is inside or outside the protected region, and the syndrome information may not distinguish whether the virtual address was inside or outside the protected region. Hence, the decision on how to handle the exception may depend on the comparison between the given virtual address and the protected region defining data for the first domain, but not the second domain. While an example of an address fault is given above, this technique of controlling whether exceptions are handled in the first domain or the second domain could also be performed for other types of exceptions which are attributed to a particular virtual address.

In one example, the first/second/further translation table address storage circuitry described above may be first/second/further registers for storing the corresponding translation table addresses.

The translation table address stored in any one of these registers may be a base address of a translation table, where the address of an entry of that translation table to be used for translating the target virtual address may be obtained by adding the base address and an offset derived from a portion of the target virtual address.

The translation table structures comprise data stored in memory at addresses identified using the address stored in the translation table address storage circuitry. For example, the translation table structures could be multi-level translation table structures, for which the address in the translation table address storage identifies an address of a first level translation table. A portion of the target virtual address provides an offset used to select the address of a particular entry in the first level translation table, and that entry can be used to identify the address of a further translation table at a next level of the tree, from which a further entry can be selected based on another portion of the target virtual address, and so on until eventually a leaf translation entry which provides the mapped intermediate or physical address corresponding to the target virtual address is obtained within a final level of translation table.

Performing a translation table walk to step through all of those levels of translation table structure can be slow and so some systems may provide at least one translation lookaside buffer (TLB) comprising buffer entries to cache information derived from address translation data from one or translation table structures. For example, the buffer entries could cache translation table entries identified in previous translation table walks, or alternatively, could cache information derived from those translation table entries (e.g. an entry may map the looked up virtual address directly to an intermediate or physical address instead of storing each of the separate translation table entries used to identify that mapping when a multi-level page table walk is performed).

In some cases a TLB could be shared between domains and so it may be useful to associate each buffer entry with a domain identifier identifying a corresponding one of the domains of the processing circuitry, so that lookups to the TLB based on a virtual address hit in the TLB when the TLB contains an entry matching the virtual address and current domain of processing, and do not hit against entries associated with a different domain to the current domain.

Sometimes the processing circuitry may need to issue a translation invalidation command which can be used to request that the TLB invalidates certain buffer entries for which at least one invalidation criterion specified by the command is satisfied. These commands can, for example, be issued when the processing circuitry has changed the page table data within one of the translation table structures, to make sure that the TLB does not continue to cache out of date information. One might expect that a translation invalidation command issued from a certain domain should only trigger invalidation of cached translation table entries specifying the domain identifier of that domain. However, as discussed above, the technique discussed above (where the first domain can have its own translation table structure for the protected region overlaid over the translation table structure referenced using the second translation table address storage circuitry) can be useful for allowing code associated with a first domain to reuse the translation data defined in a translation structure managed by code in the second domain. This means it is possible that, when a translation invalidation command is issued from the second domain, the translation data which has been changed by the second domain code could also have been used by the first domain and cached in the TLB associated with a domain identifier identifying the first domain. Hence, in response to a translation invalidation command issued when in the second domain, the TLB may invalidate buffer entries which meet the specified invalidation criterion regardless of whether they are associated with the domain identifier identifying the first domain or the second domain.

The techniques discussed above can be particularly useful for implementations where, based at least on a current domain of the processing circuitry, the address translation circuitry translates the target virtual address to the target physical address in one of two or more distinct physical address spaces selected based on the current domain.

In some processing systems, all virtual addresses may be mapped by the address translation circuitry onto a single physical address space which is used by the memory system to identify locations in memory to be accessed. In such a system, control over whether a particular software process can access a particular address may be provided solely based on the translation table structures used to provide the address translation mappings. However, such page table structures may typically be defined by an operating system and/or a hypervisor. If the operating system or the hypervisor is compromised then this may cause a security leak where sensitive data or code may become accessible to an attacker.

Therefore, to support a desire for certain processes to execute securely in isolation from other processes, the system may support operation in a number of domains and a number of distinct physical address spaces may be supported. For at least some components of the memory system, memory access requests whose virtual addresses are translated into physical addresses in different physical address spaces are treated as if they were accessing completely separate addresses in memory, even if the physical addresses in the respective physical address spaces actually correspond to the same memory system location. By isolating accesses from different domains of operation of the processing circuitry into respective distinct physical address spaces as viewed by some memory system components, this can provide a stronger security guarantee which does not rely on the page table permission information set by an operating system or hypervisor.

Normally, in systems supporting distinct physical address spaces accessible to different domains then one would expect that each domain should be associated with an entirely separate set of translation table data (page table structures). However, increasingly there is a desire to provide, for applications which generally run in one domain, a certain part of that application which operates in another domain using a different physical address space to provide added security. For such a use case, the techniques discussed above using the first/second translation table address storage circuitry can be particularly useful to simplify the development of the sandboxed component which will operate with the distinct physical address space of a different domain, as it reduces the need for synchronisation between translation table structures which may be stored at physical addresses within different physical address spaces.

More particularly, the first and second domains described above be associated with first and second physical address spaces respectively. The first physical address space may be accessible from the first domain and inaccessible from the second domain. The second physical address space may be accessible from both first and second domains. Hence the first domain is the more secure domain which has access to both domains' physical address spaces, while the second domain cannot access the first domain's physical address space. Hence, it is the first domain which has greater access rights to the respective physical address spaces that can select between the first/second translation table addresses for use in its page table walks. This recognises that while it may be appropriate for the first domain to reuse translation tables associated with the second domain, reuse of the first domain's translation tables by the second domain may not be appropriate.

Some systems may support additional domains as well as the first and second domains discussed above, for example there may be a third domain which has a third physical address space associated with it. The third physical address space may be accessible from the third domain but inaccessible from the first domain and the second domain. For example, the third domain could a root domain which is responsible for managing switching between the first and second domains. Alternatively, the third domain could be an additional domain orthogonal to the first domain which, similar to the first domain, has its third physical address space inaccessible to the second domain, but where the first physical address space is not accessible to the third domain and the third physical address space is not accessible to the first domain, so as to provide two distinct processing environments both more secure than the second domain, but which do not need to trust each other's code.

Regardless of the particular form of the third domain, when the processing circuitry is in the third domain, the address translation circuitry may translate the target virtual address based on address translation data from a translation table structure identified by a translation table address obtained from a storage location selected independent of a determination of whether the target virtual address is inside or outside the at least one protected region. For example, third translation table address storage circuitry may be provided to store a third translation table address, and when the processing circuitry is in the third domain then it may obtain its translation table address from that third translation table address storage circuitry.

Alternatively, when in the third domain one of the first and second translation table address storage circuitry could be used to provide the translation table address (although the address stored in that storage could be changed on a switch of domain so that the third domain could still reference a different translation table structure).

Hence, it is not essential for all domains to use the mechanism described above of selecting which translation table address to use based on whether the target virtual address is in the protected region.

In some implementations, the protected region defining data storage circuitry may be configured to store region defining data defining a single protected region. Other approaches may support region defining data which has a format capable of indicating two or more discontiguous protected regions. For each protected region, the region defining data could, for example, specify a base address of the protected address region and a size of the protected address region. The size could be identified by specifying a size value representing an offset of an end address of the protected address region relative to the base address, or by specifying the end address explicitly as an absolute address.

As mentioned above, it is possible for some systems to implement two-stage address translation based on a first-stage translation table structure specifying mapping from the target virtual address to a target intermediate address and a second-stage translation table structure specifying mapping from the target intermediate address to the target physical address. For selecting which translation table address to use for the first-stage translation table structure (at least when in the first domain as described above), the address translation circuitry may select between the first/second translation table structures based on whether the target virtual address is in the protected region. Hence, the first/second translation table address storage circuitry could store first-stage table addresses used to identify translation table structures selectable as the first-stage translation table structure. The address translation circuitry may obtain a first-stage translation table address identifying the first-stage translation table structure from one of the first translation table address storage circuitry and the second translation table address storage circuitry selected based on a determination of whether the target virtual address is in or outside the at least one protected region.

Similarly, selection of the second-stage translation table structure may (at least when processing in a first domain as discussed above) depend on whether the target virtual address is in or outside the at least one protected region. Hence, a second-stage translation table address identifying the second-stage translation table structure may be obtained from one of first second-stage translation table address storage circuitry and second second-stage translation table address storage circuitry selected based on a determination of whether the target virtual address is in or outside the at least one protected region. The first/second second-stage translation table address storage circuitry may for example comprise further registers provided in addition to the registers used for the first/second (first-stage) translation table address storage circuitry as described above.

The techniques discussed above may be implemented within a data processing apparatus which has hardware circuitry providing the first/second address storage circuitry (and if provided, third/further address storage circuitry), region defining data storage circuitry and address translation circuitry as discussed above.

However, the same technique can also be implemented within a computer program which executes on a host data processing apparatus to provide an instruction execution environment for execution of target code. Such a computer program may control the host data processing apparatus to simulate the architectural environment which would be provided on a hardware apparatus which actually supports target code according to a certain instruction set architecture, even if the host data processing apparatus itself does not support that architecture. Hence, the computer program may comprise address translation program logic which supports address translation from a target virtual address to a target physical address, emulating the behaviour of the address translation circuitry discussed above. Also, instead of providing hardware storage to store the first and second translation table addresses and the region defining data, the computer program may have state emulating logic which maintains state information emulating architectural state of a target instruction set architecture associated with a target code, where that state information specifies the first and second translation table addresses and the region defining data. In response to a memory access instruction within the target code, the address translation program logic may translate the target virtual address based on either the first or second translation table structure identified by the first or second translation table address, depending on whether the target virtual address is in the protected region, similar to the function of the address translation circuitry described earlier.

For the simulation computer program, the address translation program logic may translate the target virtual address into a simulated target physical address which (from the point of view of the translation table structures defined according to the target instruction set architecture) are expected to refer to physical locations in memory, but where the target code is being executed by the instruction execution environment provided by the simulation program, the translated addresses actually represent simulated physical addresses which are mapped by the simulation onto portions of virtual address space in the host virtual address space of the host processor executing the simulator program.

Such simulation programs are useful, for example, when legacy code written for one instruction set architecture is being executed on a host process which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture.

The simulation program may be stored on a storage medium, which may be an non-transitory storage medium.

DESCRIPTION OF EXAMPLES

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. The granule protection information may be cached within a granule protection information cache 22, similar to a caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
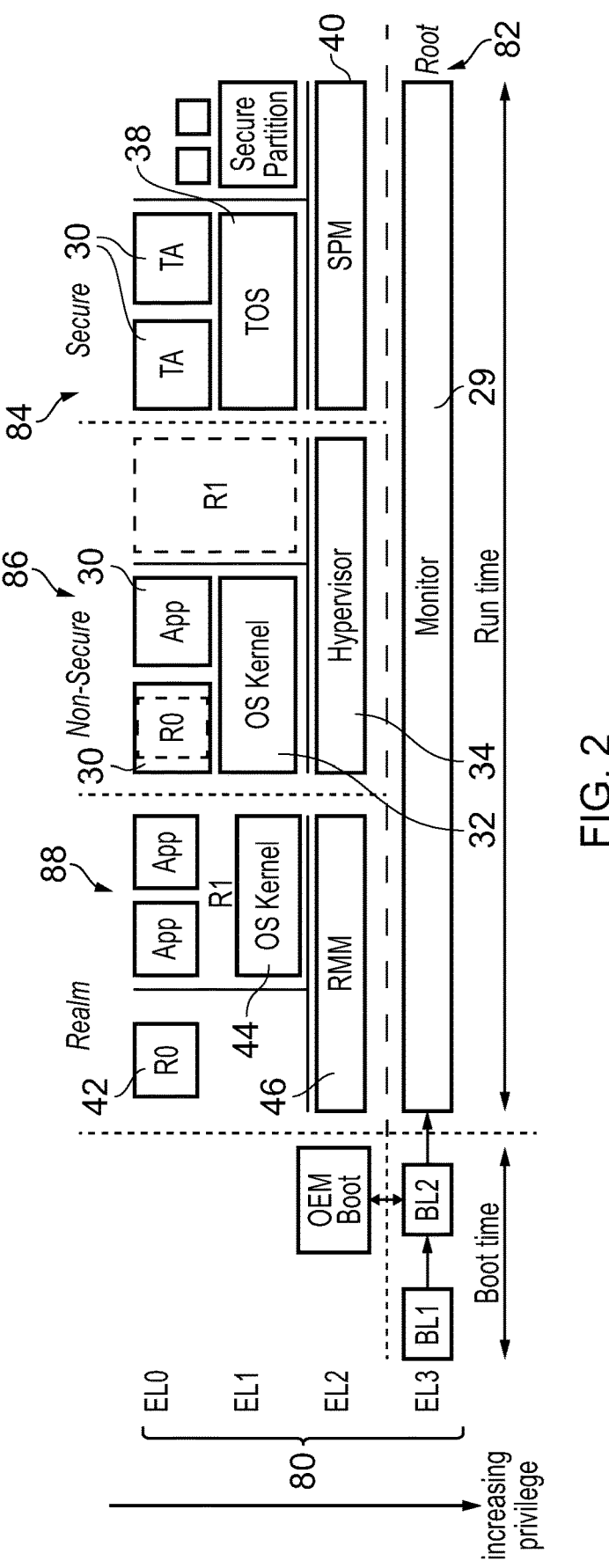
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, ED1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level ED is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, ED or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at ED and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at ED1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating
system 32 or hypervisor 34 being compromised by an
attacker). Also, while the secure domain 84 could be used for
such user-provided applications needing secure processing,
in practice this causes problems both for the user providing
the code requiring the secure computing environment and
for the providers of existing code operating within the secure
domain 84. For the providers of existing code operating
within the secure domain 84, the addition of arbitrary
user-provided code within the secure domain would increase
the attack surface for potential attacks against their code,
which may be undesirable, and so allowing users to add code
into the secure domain 84 may be strongly discouraged. On
the other hand, the user providing the code requiring the
secure computing environment may not be willing to trust
all of the providers of the different pieces of code operating
in the secure domain 84 to have access to its data or code,
if certification or attestation of the code operating in a
particular domain is needed as a prerequisite for the user-
provided code to perform its processing, it may be difficult
to audit and certify all of the distinct pieces of code
operating in the secure domain 84 provided by the different
software providers, which may limit the opportunities for
third parties to provide more secure services.

Therefore, as shown in FIG. 2, an additional domain 88,
called the realm domain, is provided which can be used by
such user-introduced code to provide a secure computing
environment orthogonal to any secure computing environ-
ment associated with components operating in the secure
domain 24. In the realm domain, the software executed can
include a number of realms, where each realm can be
isolated from other realms by a realm management module
(RMM) 46 operating at exception level EL2. The RMM 46
may control isolation between the respective realms 42, 44
executing the realm domain 88, for example by defining
access permissions and address mappings in page table
structures similar to the way in which hypervisor 34 man-
ages isolation between different components operating in the
non-secure domain 86. In this example, the realms include
an application-level realm 42 which executes at EL0 and an
encapsulated application/operating system realm 44 which
executes across exception levels EL0 and ED. It will be
appreciated that it is not essential to support both EL0 and
EL0/EL1 types of realms, and that multiple realms of the
same type could be established by the RMM 46.

The realm domain 88 has its own physical address space
allocated to it, similar to the secure domain 84, but the realm
domain is orthogonal to the secure domain 84 in the sense
that while the realm and secure domains 88, 84 can each
access the non-secure PAS associated with the non-secure
domain 86, the realm and secure domains 88, 84 cannot
access each other's physical address spaces. This means that
code executing in the realm domain 88 and secure domains
84 have no dependencies on each other. Code in the realm
domain only needs to trust the hardware, the RMM 46 and
the code operating in the root domain 82 which manages
switching between domains, which means attestation and
certification becomes more feasible. Attestation enables a
given piece of software to request verification that code
installed on the device matches certain anticipated proper-
ties. This could be implemented by checking whether a hash
of the program code installed on the device matches an
expected value that is signed by a trusted party using a
cryptographic protocol. The RMM 46 and monitor code 29
could for example be attested by checking whether a hash of
this software matches an expected value signed by a trusted
party, such as the silicon provider who manufactured the integrated circuit comprising the processing system 2 or an
architecture provider who designed the processor architec-
ture which supports the domain-based memory access con-
trol. This can allow user-provided code 42, 44 to verify
whether the integrity of the domain-based architecture can
be trusted prior to executing any secure or sensitive func-
tions.

Hence, it can be seen that the code associated with realms
42, 44, which would previously have executed in the non-
secure domain 86 as shown by the dotted lines showing the
gap in the non-secure domain where these processes would
previously have executed, can now be moved to the realm
domain where they may have stronger security guarantees
because their data and code is not accessible by other code
operating in a non-secure domain 86. However, due to the
fact that the realm domain 88 and secure domain 84 are
orthogonal and so cannot see each other's physical address
spaces, this means that the providers of code in the realm
domain do not need to trust the providers of code in the
secure domain and vice versa. The code in the realm domain
can simply trust the trusted firmware providing the monitor
code 29 for the root domain 82 and the RMM 46, which may
be provided by the silicon provider or the provider of the
instruction set architecture supported by the processor, who
may already inherently need to be trusted when the code is
executing on their device, so that no further trust relation-
ships with other operating system vendors, OEMs or cloud
hosts are needed for the user to be able to be provided with
a secure computing environment.

This can be useful for a range of applications and use
cases, including for example mobile wallet and payment
applications, gaming anti-cheating and piracy mechanisms,
operating system platform security enhancements, secure
virtual machine hosting, confidential computing, network-
ing, or gateway processing for Internet of Things devices. It
will be appreciated that users may find many other applica-
tions where the realm support is useful.

To support the security guarantees provided to a realm,
the processing system may support an attestation report
function, where at boot time or at run time measurements are
made of firmware images and configuration, e.g. monitor
code images and configuration or RMM code images and
configuration and at runtime realm contents and configura-
tion are measured, so that the realm owner can trace the
relevant attestation report back to known implementations
and certifications to make a trust decision on whether to
operate on that system.

As shown in FIG. 2, a separate root domain 82 is provided
which manages domain switching, and that root domain has
its own isolated root physical address space. The creation of
the root domain and the isolation of its resources from the
secure domain allows for a more robust implementation
even for systems which only have the non-secure and secure
domains 86, 84 but do not have the realm domain 88, but can
also be used for implementations which do support the realm
domain 88. The root domain 82 can be implemented using
monitor software 29 provided by (or certified by) the silicon
provider or the architecture designer, and can be used to
provide secure boot functionality, trusted boot measure-
ments, system-on-chip configuration, debug control and
management of firmware updates of firmware components
provided by other parties such as the OEM. The root domain
code can be developed, certified and deployed by the silicon
provider or architecture designer without dependencies on
the final device. In contrast the secure domain 84 can be
managed by the OEM for implementing certain platform and
security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
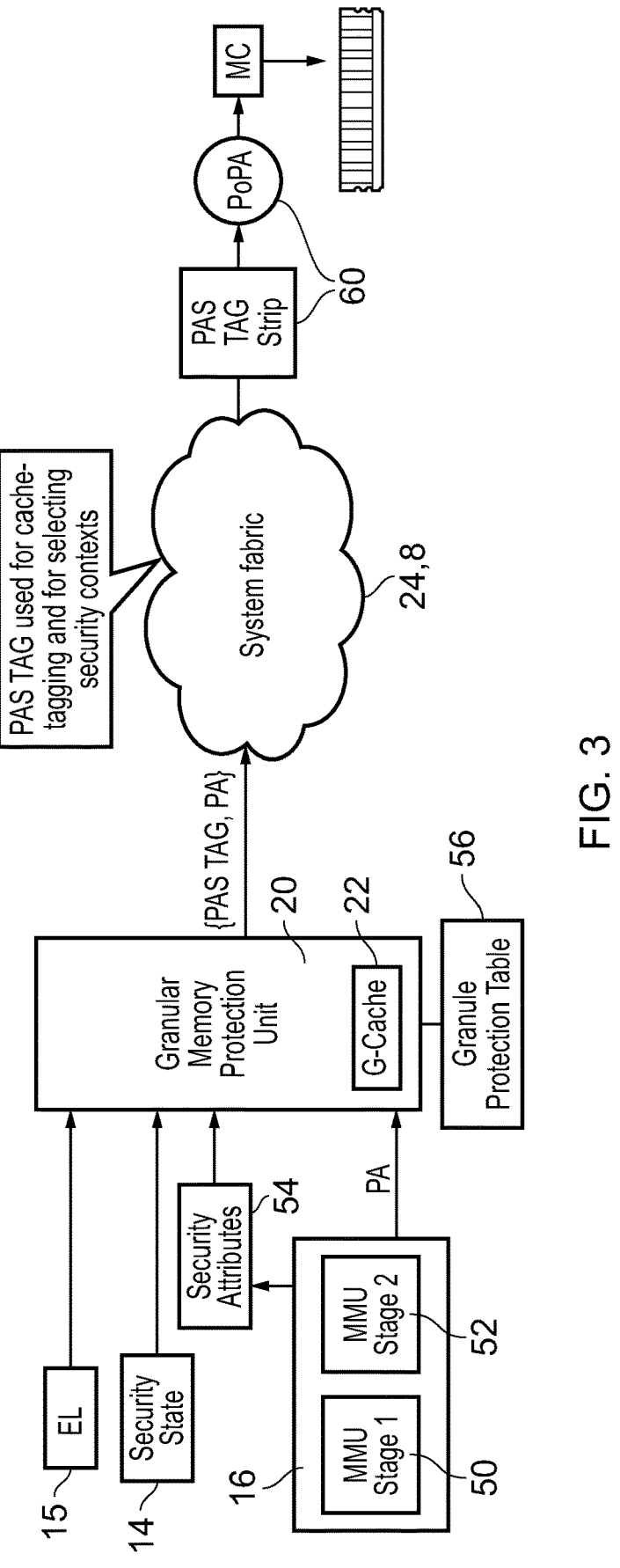
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or ED code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or ED1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM 40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GM PU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side without diminishing the security guarantees comparing to Slave-side filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System— "Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

Figure 4:
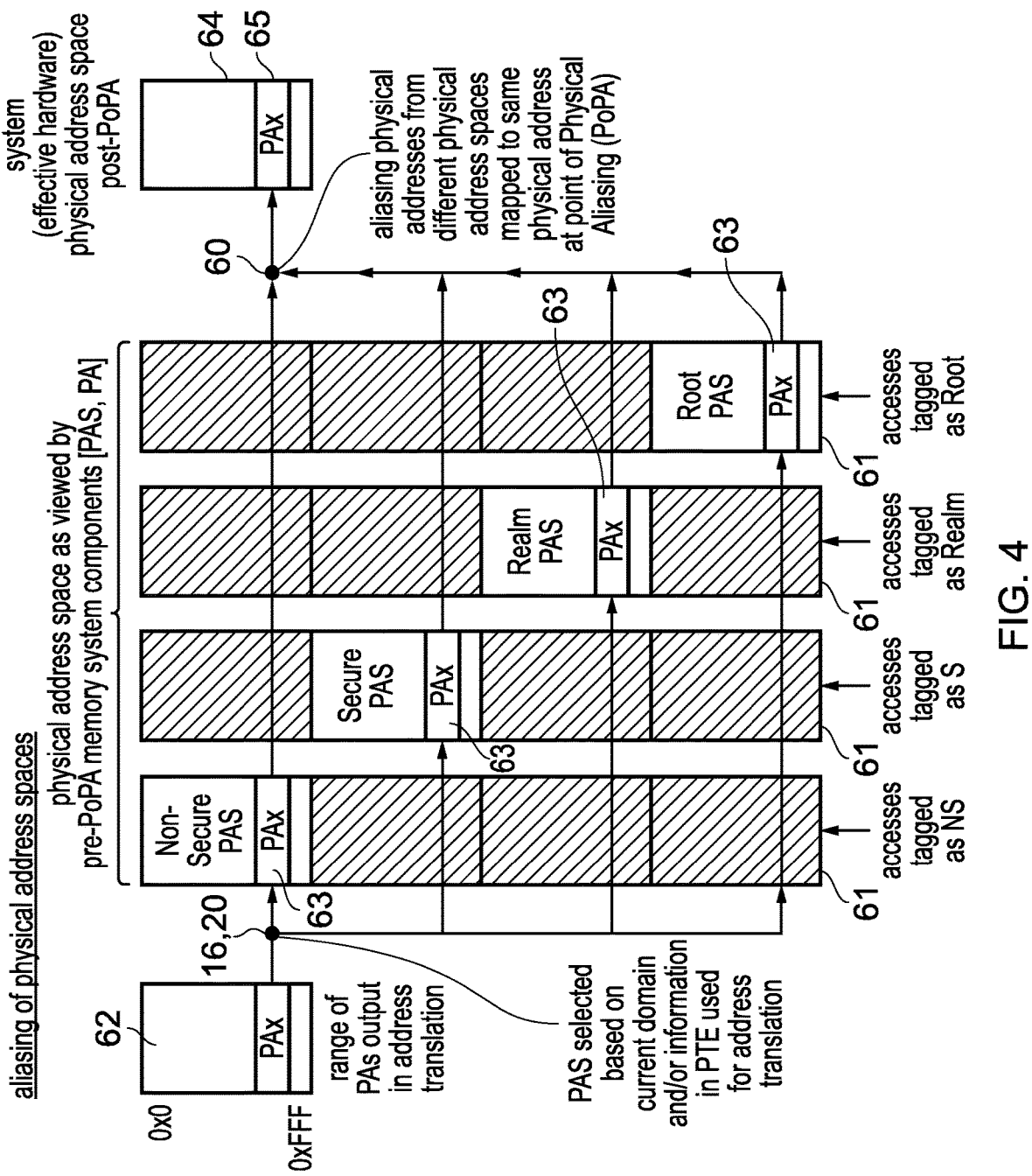
FIG. 4 schematically illustrates aliasing of a number of physical address spaces onto a system physical address space identifying locations in the memory system.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
|---|---|---|---|---|
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

Figure 14:
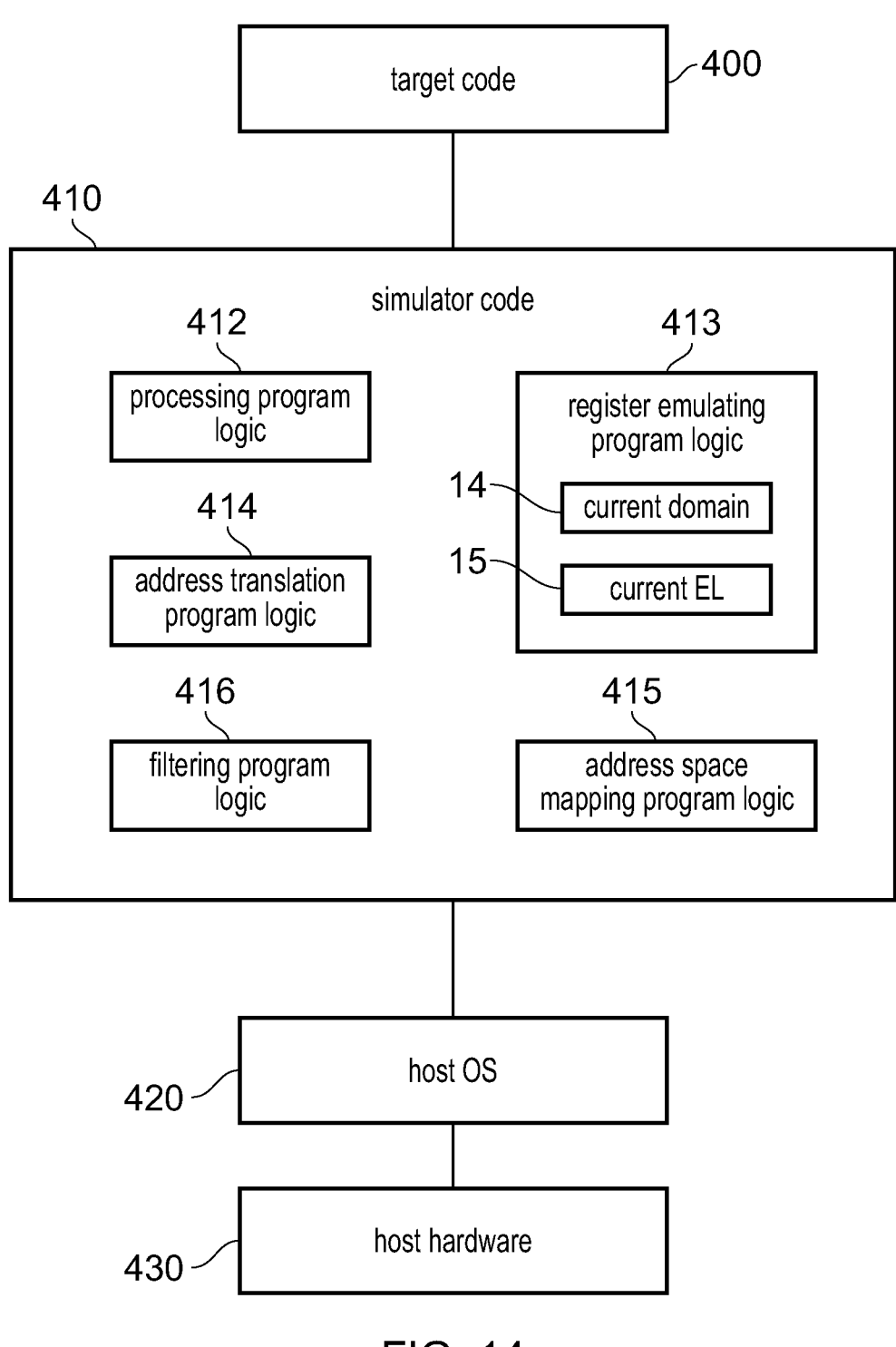
FIG. 14 shows a simulator example that may be used.

The system may include more than one PoPA 60 (e.g. as shown in FIG. 14 discussed below). At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

Figure 5:
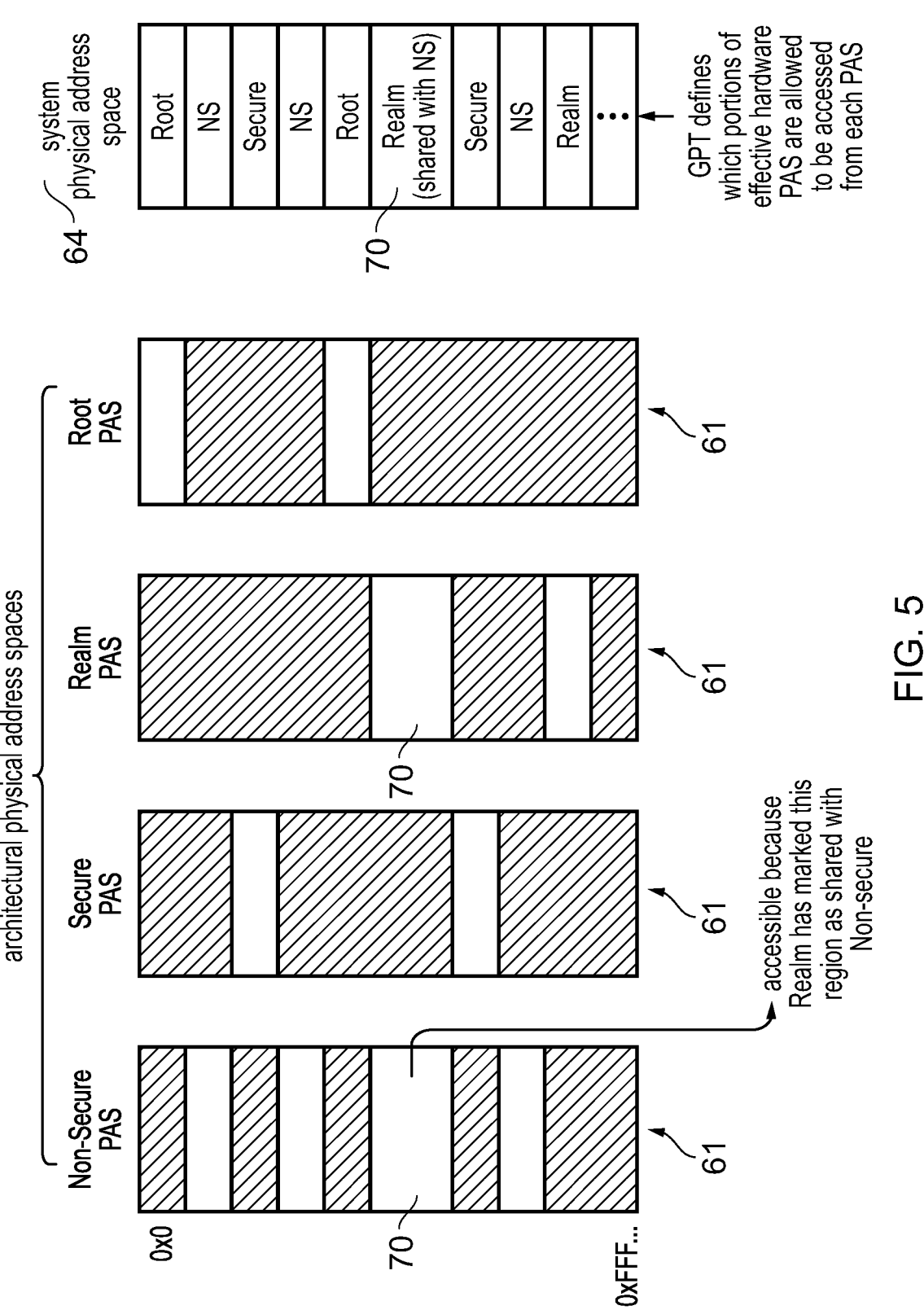
FIG. 5 illustrates an example of partitioning the effective hardware physical address space so that different architectural physical address spaces have access to respective portions of the system physical address space.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/ inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 26 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

Figure 6:
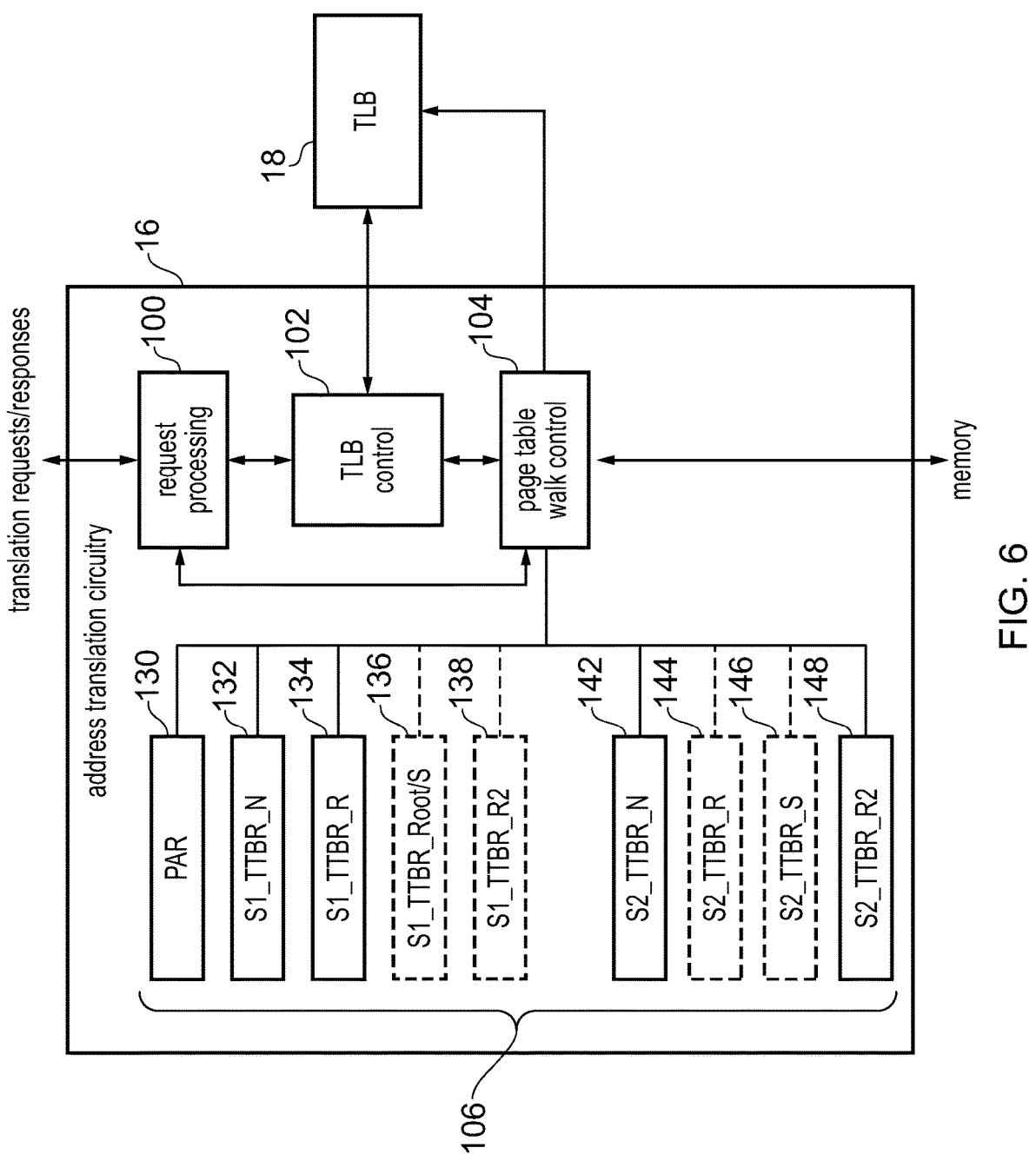
FIG. 6 illustrates address translation circuitry.

FIG. 6 illustrates the address translation circuitry 16 in more detail. The address translation circuitry 16 includes translation request processing circuitry 100, TLB control circuitry 102 and page table walk control circuitry 104. The address translation circuitry 16 also has access to a number of translation control registers 106, which are shown in FIG. 6 as being provided within the address translation circuitry 16, but which in other embodiments could be provided within the register bank 12 accessed by the processing circuitry 10 for general operands.

The request processing circuitry 100 receives a translation request from the processing circuitry 10 specifying a target virtual address to be translated and a Domain ID identifying a current domain of operation. In response to the translation request, the request processing circuitry 100 controls the TLB control circuitry to perform a lookup in the TLB 18 to determine whether the TLB includes a buffer entry corresponding to the target virtual address and current domain. Buffer entries in the TLB may be tagged with a corresponding domain identifier indicating a domain which was the current domain at the time the TLB entry was allocated to the TLB 18, and lookups in the TLB may be qualified by the current domain to prevent an access from one domain hitting against translation data allocated into the TLB in response to a request associated with another domain. When the request hits in the TLB, the matching TLB entry may return an address mapping for mapping the target virtual address to a translated address (as well as returning access permissions and/or the PAS selection information described earlier). The request processing circuitry 100 may use the returned information to determine whether the memory access is allowed. If the memory access is not allowed (based on the access permissions), an address fault is raised and the memory access prevented from being carried out. If the memory access is permitted, the request processing circuitry 100 returns the translated address (and in the system shown in FIG. 1, forwards the translated address (physical address) to the PAS filter 20 to perform the granule protection lookup/ PAS filtering step).

If the lookup in the TLB misses, so that no corresponding buffer entry is found for the requested target virtual address and domain identifier, then the TLB control circuitry 102 controls the page table walk control circuitry 104 to issue one or more page table walk requests to request one or more page table entries from translation table structures (also known as page table structures) stored in memory.

Figure 7:
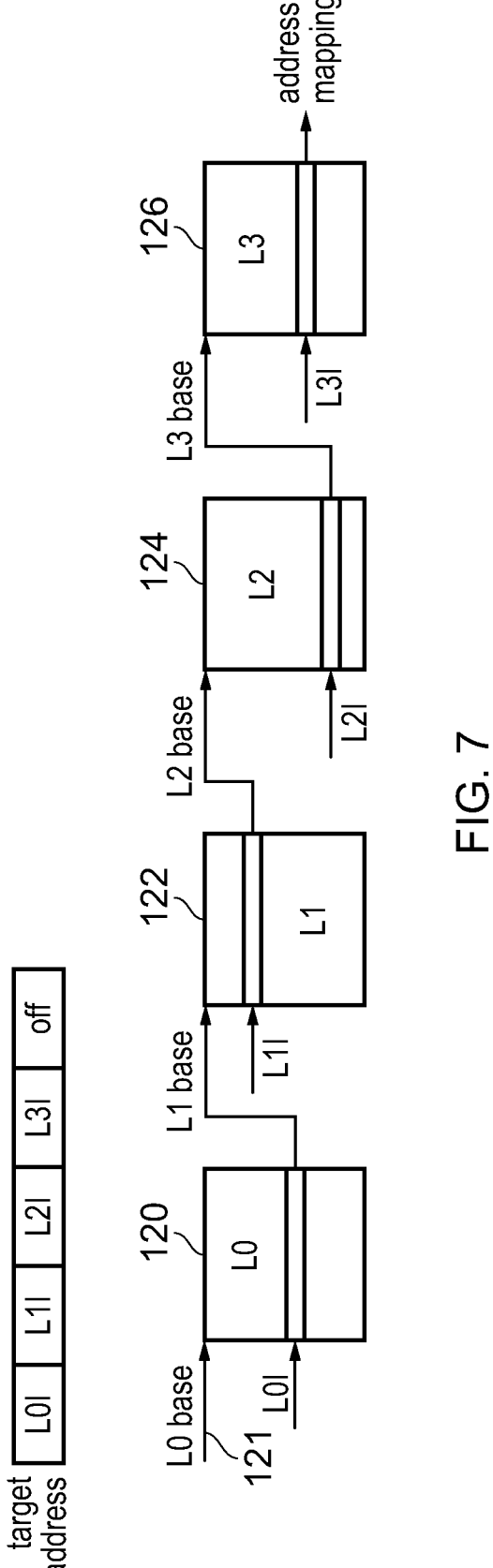
FIG. 7 illustrates an example of a multi-level translation table structure.

As shown in FIG. 7, a page table structure may be implemented using multiple levels of page tables 120, 122, 124, 126, which may be traversed in a page table walk operation to identify the address mapping for a particular target address. As shown in FIG. 7, a given set of index bits L0I may be used to index into a level zero page table 120 whose location in memory is identified by a level zero (L0) base address 121. As will be described in more detail below, the L0 base address 121 is selected based on information in the translation control registers 106. The indexed entry of the L0 table 120 identifies an L1 base address identifying the location in memory of an L1 page table 122. A different subset of index bits L1I from the target address selects one of the entries of the L1 page table 122, which then identifies an L2 base address identifying the memory location of a L2 page table 124. Another subset of index bits L2I from the target address indexes into the L2 page table 124, to identify an L3 base address which identifies the location of an L3 page table 26. Yet another subset of bits L3I of the target address then selects a particular entry of the L3 page table 126 which provides the actual address mapping for mapping the target address into a translated address such as a physical address (as well as providing any associated access permission and/or PAS selection information). Hence, the L3 page table 126 is the final page table providing leaf page table entries which provide the actual address mapping information and the higher level page tables 120, 122, 124 provide intermediate entries which identify the base address of a next level page table.

It will be appreciated that providing four levels of page table is just one example and others could use different numbers of levels of page tables. Also, it is possible that, if a larger block of address space is to share the same translation mapping and other information, then one of the entries in the higher-level page tables 120, 122, 124 could specify that it is a leaf entry providing the address mapping directly so that no further stepping through subsequent levels is required (while other entries within the same higher-level page table 120, 122, 124 could still act as branch entries which contain the base address pointing to a subsequent-level page table).

By splitting page tables into different levels in this way, the total amount of memory storage required for storing the entire page table structure can be reduced because it is not necessary to locate the address mappings for translating a given amount of address space in a region or memory having the equivalent size to the address size being mapped, exploiting the fact that often large chunks of the address space do not have any mappings defined yet by the operating system or other process setting the address translation data. While FIG. 7 shows an example where the index bits L0I, L1I etc. are used directly as the index for selecting a corresponding page table entry, the index could also be the result of a hash function applied to the index bits.

In some systems, the TLB 18 could include separate cache structures for caching translation entries from different levels of the page table. For example, the TLB 18 could include a main TLB structure for caching leaf entries from the final level page table 126, as well as a walk cache structure for caching higher level page table entries from page tables 120, 122, 124. On the other hand, other embodiments may provide a TLB which uses a shared cache structure to cache address translation data from multiple levels of the page table. Other embodiments may only cache the leaf entries which can be looked up to provide the address mapping corresponding to a given VA, but may not carry branch entries from higher-level page tables 120, 122, 124. Any of these approaches can be used. While FIG. 6 shows a single TLB 18, some implementations may include multiple levels of TLB cache structures in a cache hierarchy, to trade off capacity against access latency (e.g. a smaller numbers of entries stored in a level 0 TLB for fast access, and a larger number of entries stored in a level 1 TLB for slower access in the event of a miss in the level 0 TLB).

For some operating states of the processor 10, the address translation process may also involve multiple stages of address translation (whether one stage or two stages of address translation are required may depend in the current exception level 15 and/or configuration information set in registers 12). For example, the VAs used to identify memory locations by the instructions executed by an application or operating system running on a CPU 4 may be translated into intermediate physical addresses (IPAs) in a stage 1 translation. A stage 1 address translation structure for controlling the stage 1 address translation may be set by the operating system or another process operating at ED for example. From the operating system's point of view the IPAs generated in the stage 1 address translation may be assumed to be the physical addresses of the actual memory locations being accessed. However, to support virtualisation and prevent identical IPAs used by different operating systems coexisting on the same device from conflicting, a hypervisor or other process operating at EL2 may then provide a further second stage address translation between the IPAs and the PAs to be provided to the memory system. As described above with reference to FIGS. 4 and 5, these PAs may be PAs within a selected physical address space, and some pre-PoPA memory system components may treat identical PA values in different physical address spaces as if they refer to different physical locations. Hence there may be a second stage translation table structure defined by code operating at EL2, to control the stage 2 address translation.

Note that each of the two stages of address translation may use multiple levels of page tables as shown in FIG. 7. Hence, a full page table walk to identify an address mapping for a given block of addresses identified by a target VA may require each of the base addresses for the page tables used in the stage 1 address translation to go through the stage 2 address translation before accessing the corresponding level of the stage 1 page table. That is, for an example where both stage 1 and stage 2 tables include 4 levels of page tables as shown in FIG. 7, the full page table walk process may include accessing the multiple levels of page tables in the following sequence:

Stage 2 translation of the base address 121 of the stage 1 level 0 page table into a PA (the stage 1 level 0 base address may be an IPA address because the stage 1 translation structures are configured by code operating at ED). The stage 2 translation comprises 4 lookups (stage 2, level 0; stage 2, level 1; stage 2, level 2; stage 2, level 3).

Stage 1 level 0 lookup based on the level 0 index portion L0I of the target VA to identify the stage 1 level 1 base address (an IPA)

Stage 2 translation of the stage 1 level 1 base address into a PA (again, comprising 4 lookups).

Stage 1 level 1 lookup based on the level 1 index portion L1I of the target VA to identify the stage 1 level 2 base address (an IPA)

Stage 2 translation of the stage 1 level 2 base address into a PA (again comprising 4 lookups)

Stage 1 level 2 lookup based on the level 2 index portion L2I of the target VA to identify the stage 1 level 3 base address (an IPA)

Stage 2 translation of the stage 1 level 3 base address into a PA (again comprising 4 lookups).

Stage 1 level 3 lookup based on the level 3 index portion L3I of the target virtual address to identify the target IPA corresponding to the target VA.

Stage 2 translation (again, comprising 4 lookups) of the target IPA into the target PA which can be returned as the translated address corresponding to the original target VA.

Hence, without any caching, the translation would comprise 24 lookups in total. As can be seen from the above sequence, performing the entire page table walk process can be very slow as it may require a large number of accesses to memory to step through each of the levels of page tables for each of the stages of address translation. This is why it is often desirable to cache not only the final level address mapping but also information from entries from higher level page tables of the stage 1 and the stage 2 tables within the TLB 18. This can allow at least some steps of the full page table walk to be bypassed even if the final level address mapping for a given target address is not currently in the address translation cache.

In systems supporting two stages of address translation, some TLBs 18 may be implemented as split TLBs where separate cache structures are provided for caching information from stage 1 and stage 2 page table structures respectively. In this case, two separate TLB lookups may be required for processing a translation request specifying a VA, one lookup in the stage 1 TLB to identify the corresponding IPA and one lookup in the stage 2 TLB to identify the PA corresponding to that IPA. Alternatively, a combined stage 1&2 TLB 18 may be provided where, although the page table walk operation for an address request subject to two stages of address translation requires separate lookups of stage 1 and stage 2 page table structures to identify first a mapping of the VA to an IPA and then to identify a mapping of the IPA to the PA, once this has been done the combined stage 1 & 2 TLB can be allocated with an entry mapping the VA to the PA directly so that on future accesses to the same VA the PA can be read out from the TLB 18 without needing to perform two separate lookups.

The translation control registers 106 are used to control selection of the level 0 base address 121 for a stage 1 or stage 2 page table structure. The translation control registers 106 include a protected address region (PAR) register 130 and a number of translation table base registers (TTBRs) 132, 134, 136, 138, 142, 144, 146, 148. Although not shown in FIG.

6, the translation control registers 106 could also include other control registers for providing control parameters, which could be banked per exception level. For example, these other control parameters could define information affecting how translations or page table walks are to be performed, e.g. defining an address size or page granule size.

The PAR register (protected region defining data storage circuitry) 130 stores region defining data specifying at least one protected region of virtual address space. For example, the region defining data could specify a base address of the protected region and a size of the protected region (either by specifying an absolute end address or by specifying the size as a relative offset of the end address relative to the base address). Some systems may support multiple PAR registers 130 to indicate more than one protected address region, but for conciseness the examples below explain the use of the PAR register 130 with reference to one protected address region. If more than one protected address region is implemented, then any comparisons are performed against each of the sets of region defining data associated with the multiple protected address regions.

The TTBRs 132, 134, 136, 138, 142, 144, 146, 148 each store a base address of a level 0 page table in a corresponding page table structure. The TTBRs 132, 134, 136, 138, 142, 144, 146, 148 can be updated by software to change which page table structure is referenced when a page table walk is required.

A non-secure stage 1 TTBR, S1_TTBR_N, 132 is provided to store the level 0 base address 121 to be used for stage 1 address translations when the current domain is the non-secure domain. Similarly, a non-secure stage 2 TTBR, S2_TTBR_N, 142 stores the level 0 base address 121 to be used for stage 2 address translations when the current domain is the non-secure domain. As mentioned below, S1_TTBR_N 132 and S2_TTBR_N 142 can also be referenced by the realm domain when the VA of an address request which misses in the TLB 18 is outside the protected address region defined by the PAR register 130. S1_TTBR_N 132 and S2_TTBR_N 142 are both examples of second translation table address storage circuitry as described above, or in an implementation where S1_TTBR_R2 138 or S2_TTBR_R2 148 is provided an example of further translation table address storage circuitry). S1_TTBR_N 132 may be readable and writable by software operating at ED or higher in any of the domains. S2_TTBR_N 142 may be readable and writable by software operating at EL2 or higher in any of the domains.

A realm stage 1 TTBR, S1_TTBR_R, 134 (an example of first translation table address storage circuitry) is provided to store the level 0 base address 121 to be used for stage 1 address translations when the current domain is the realm domain and the target VA is within the protected address region defined by the PAR register 130. S1_TTBR_R 134 may be readable and writable by software operating at ED or higher in the realm domain or root domain. Similarly, a realm stage 2 TTBR, S2_TTBR_R, 144 (also an example of first translation table address storage circuitry, or of first second-stage translation table address storage circuitry) is provided to store the level 0 base address 121 to be used for stage 2 address translations when the current domain is the realm domain and the target VA is within the protected address region defined by the PAR register 130. S2_TTBR_R 144 may be readable and writable by software operating at EL2 or higher in the realm domain or the root domain.

Optionally, additional stage 1 TTBRs 136, shown for conciseness as combined into a single register in FIG. 6, but which could also be split into two separate registers, could be provided associated with the root and/or secure domains. S1_TTBR_Root and/or S1_TTBR_S 136 are examples of third translation table address storage circuitry as mentioned above. The relevant one of S1_TTBR_Root and S1_TTBR_S 136 can be referenced for page table walks triggered by stage 1 address translations, when operating in the corresponding one of the root and secure domains. S1_TTBR_Root can be readable and writable only from the Root domain. S1_TTBR_S 136 may be readable and writable by software operating at ED or higher in the secure domain or the root domain. Similarly, an optional additional stage 2 TTBR 146, labelled S2_TTBR_S, could be provided associated with the secure domain (the root domain does not need a stage 2 TTBR because the root domain only requires one stage of address translation). Hence, S2_TTBR_S 146 could be referenced for page table walks triggered by stage 2 address translations, when operating in the secure domain. S2_TTBR_S 146 may be readable and writable by software operating at EL2 or higher in the secure domain.

Alternatively, S1_TTBR_Root and/or S1_TTBR_S 136 may be omitted and in that case the TTBR used for stage 1 address translations for the Root and/or secure domains could be the S1_TTBR_N 132 register instead, which is shared with the non-secure domain. Similarly, S2_TTBR_S 146 could be omitted, and in that case the TTBR used for stage 2 address translations for the secure domain could be S2_TTBR_N 142 instead. In this case, on switching domains, the Root domain code may update the contents of S1_TTBR_N 132 or S2_TTBR_N 142 to change which address translation structure is referenced depending on the domain being entered.

Also, optionally for some implementations, a second realm stage 1 TTBR 138 (S1_TTBR_R2) could be provided, and/or a second realm stage 2 TTBR 148 (S2_TTBR_R2) could be provided, as an alternative example of second translation table address storage circuitry. These registers could provide an alternative base address to use for stage 1 or stage 2 translations for realm domain accesses to addresses outside the protected address region defined by the PAR 130. If S1_TTBR_R2 138 is provided, then it may be readable and writable by software operating at ED or higher in the realm domain or root domain. If S2_TTBR_R2 148 is provided, then it may be readable and writable by software operating at EL2 or higher in the realm domain or root domain.

FIG. 8 illustrates a method of handling address translations for requests issued from the realm domain. At step 150 the request processing circuitry 100 controls the TLB control circuitry 102 to perform a lookup in the TLB 18 based on the target VA of a memory access request (and based on a current domain identifier). At step 152 the TLB control circuitry 102 determines whether a TLB hit has been identified. A hit is identified when the TLB 18 includes a valid entry corresponding to the specified memory access request and current domain identifier (although as the realm domain may be allowed to reuse translation table structures associated with the non-secure domain, accesses from the realm domain may be considered to hit against TLB entries tagged with the non-secure domain identifier). If there is no valid entry which corresponds to the specified memory access request then a TLB miss occurs.

If a TLB miss occurs, then at step 156 the page table walk control circuitry 104 compares the target VA and the region defining data stored in the PAR register 130, to determine whether the target VA is in the protected address region (PAR).

If the target VA is outside the PAR then at step 158 the page table walk control circuitry 104 initiates a page table walk operation, with the level 0 base address 121 of the stage 1 page table structure obtained from S1_TTBR_N 132, which is shared with the non-secure domain. If needed for a stage 2 translation, the level 0 base address 121 for the stage 2 page table structure is obtained from S2_TTBR_N 142. Hence, for VAs outside the PAR, the same stage 1 or stage 2 translation data is used which would be used for accesses to those VAs by requests made form the non-secure domain. This is particularly useful for R0 realms 42 as shown in FIG. 2 which represent a carve-out from an application 30 running in the non-secure domain 86. The carved-out realm enclave 42 can have its code and secure data allocated to VAs in the PAR, and accesses to data outside the PAR may share the same address translation data as used by the non-secure domain 86 to avoid the RMM 46 having to manage synchronisation of Realm page tables with Non-secure page tables maintained by the OS 32.

On the other hand, if at step 156 it was determined that the target VA is in the PAR, then at step 162 the page table walk control circuitry 104 initiates a page table walk operation, with the level 0 base address 121 of the stage 1 page table structure obtained from S1_TTBR_R 134. If stage 2 translation is required, then the stage 2 level 0 base address is obtained from S2_TTBR_R 144. Hence, accesses within the PAR access a different page table structure from those used by the non-secure domain, so that special access permissions can be defined for the secure enclave represented by the R0 realm 42 in the realm domain 88.

Hence, at steps 158 and 162, a number of page table walk requests are issued to memory specifying addresses derived from S1_TTBR_R 134, S1_TTBR_N 132, S2_TTBR_R 144 or S2_TTBR_N 142 in combination with offset bits of the VA/IPA, or to addresses derived from further address pointers stored in page table entries identified by earlier page table walk memory accesses. Note that the page table walk memory accesses will themselves be subject to the PAS filtering checks performed by the PAS filter as described above. Also, in systems where the TLB includes at least one walk cache TLB structure for caching higher-level entries of a page table structure, then at steps 158 and 162 it may not be necessary to perform the full page table walk operation outlined above, as some steps could be skipped if the relevant higher-level entry is cached in the walk cache structure.

Once any stage 1 and/or stage 2 entries required to identify the VA to PA mapping have been obtained from memory, then regardless of whether the VA was in the PAR or not, at step 160 one or more new TLB entries may be allocated to the TLB 18 to cache obtained translation data. As described above, the TLB could be implemented in a number of ways, so the precise form of the cached data can vary significantly. When a TLB entry is allocated following a realm domain access, then the new TLB entry may specify a domain identifier tag indicating the realm domain, regardless of whether it contains information obtained from the non-secure or realm page tables identified using S1/S2_TTBR_N (132 or 142) or S1/S2_TTBR_R (134 or 144). Even though the realm domain shares the same non-secure domain page tables for accessing addresses outside the PAR, it may be undesirable to allow the non-secure domain to hit against entries allocated into the TLB by code operating within the R0 realm 42, as otherwise the code in the non-secure domain 86 could use TLB side channels based on access timing measurements to probe what addresses were allocated to the TLB by the realm domain, which might leak information on the secure activity of the R0 realm 42.

Also, at step 160 the VA is translated into a PA using the obtained translation data and returned in a translation response (or provided along with PAS selection to the PAS filter 20).

If at step 152 a TLB hit was identified, then at step 164 the target VA is translated into a PA based on cached address translation data previously allocated into the TLB. Hence, the target VA is translated based on translation data previously obtained from one of the first/second translation table structures identified by one of S1_TTBR_R 134 and S1_TTBR_N 132 which was selected based on whether the target VA is in the PAR or not (for stage 1), or by one of S2_TTBR_R 144 and S2_TTBR_N 142 which was selected based on whether the target VA is in the PAR or not (for stage 2). However, this comparison of the target VA and PAR would have been done at step 156 at the time of handling a TLB miss, so does not need to be done again at step 164, because on a TLB hit against an entry providing the address translation mapping the previously obtained translation data can simply be read out from the TLB 18 and there may be no need to check the PAR register 130 or TTBRs 132-148 (although with a split stage 1/stage 2 TLB approach there may need to be separate decisions on whether there is a hit for the stage 1 TLB and stage 2 TLB respectively).

Figure 9:
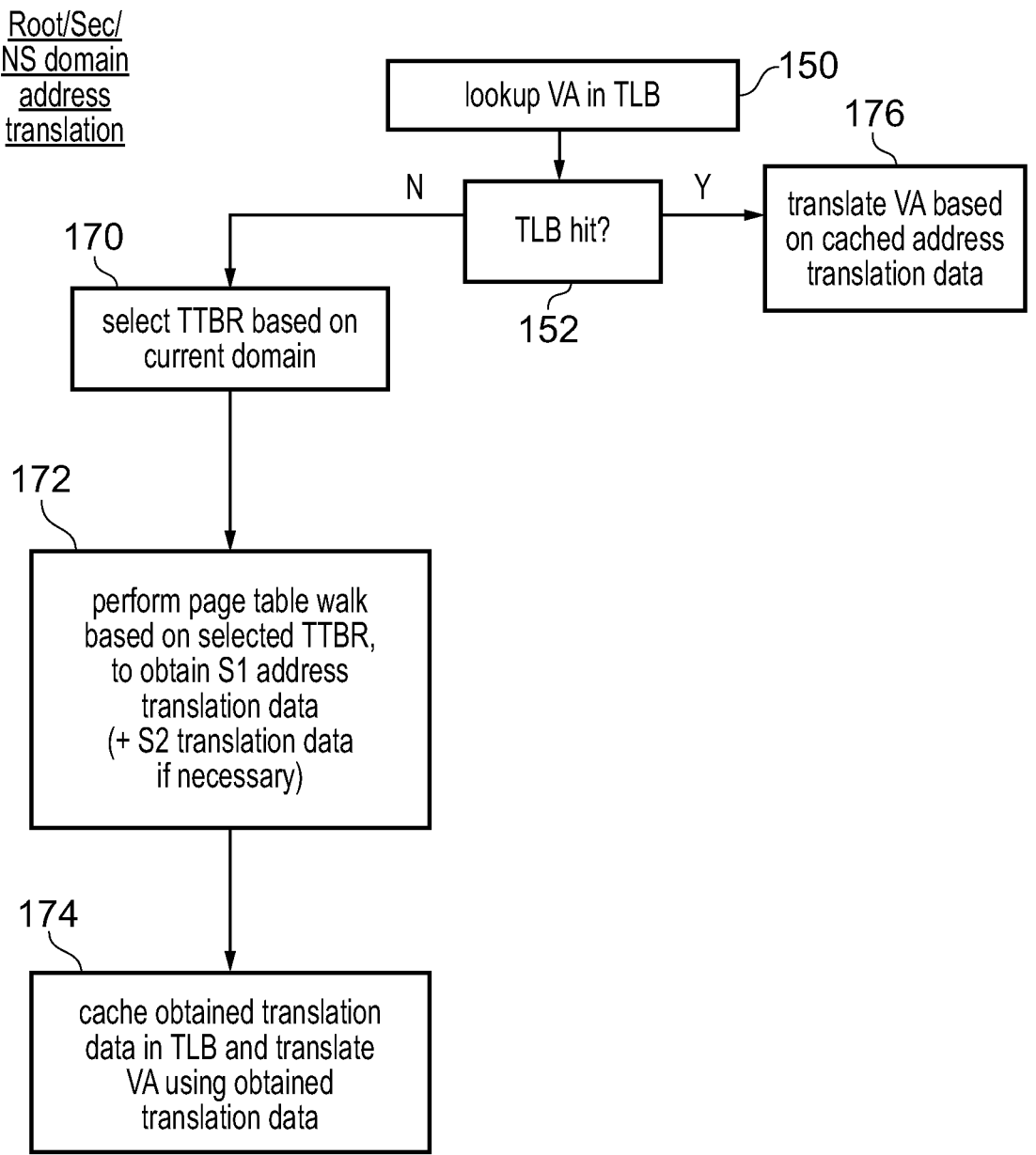
FIG. 9 illustrates a method of controlling address translation in one of a root domain, a secure domain and a less secure domain.

FIG. 9 shows a method of controlling address translations for accesses from the root, secure or non-secure domain. Steps 150 and 152 are the same as in FIG. 8, except that the lookup in the TLB will be based on a current domain identifier specifying the relevant one of the root, secure or non-secure domain. If a TLB miss is detected, then at step 170 the TTBR to use to identify the level 0 page table for stage 1 or stage 2 is selected based on the current domain. For stage 1 translations in the non-secure domain, S1_TTBR_N 132 is used. For stage 1 translations in the root domain or secure domain, if a dedicated S1_TTBR 136 for that domain is implemented, then that S1_TTBR 136 is used to provide the level 0 base address, but if a separate S1_TTBR 136 is not implemented, then S1_TTBR_N is used. The L0 base address for stage 2 translation is obtained from S2_TTBR_N 142 when the current domain is the non-secure domain, and from S2_TTBR_S 146 when the current domain is the secure domain (or if a dedicated S2_TTBR_S 146 for secure domain is not implemented, then secure accesses could use the S2_TTBR_N 142 register to obtain the level 0 base address for stage 2 translations). The root domain does not require stage 2 translations.

At step 172 a page table walk operation is performed based on the level 0 base address obtained from the selected S1_TTBR to obtain stage 1 address translation data. If stage 2 translation is necessary, stage 2 address translation data is obtained based on accesses to address derived via the stage 2 L0 base address obtained from one of S2_TTBR_N 142 and S2_TTBR_S 146.

At step 174, obtained translation data is cached in the TLB tagged by the current domain identifier, and the VA is translated to the PA using the obtained translation data, similar to step 160 of FIG. 8.

On the other hand, if a TLB hit was identified at step 152 then at step 176 the VA is translated based on cached address translation data read from the TLB 18 similar to step 162 of FIG. 8, except this time the cached address translation data was previously obtained from a translation table structure selected independent of any comparison between the VA and the PAR defined by PAR register 130.

Figure 10:
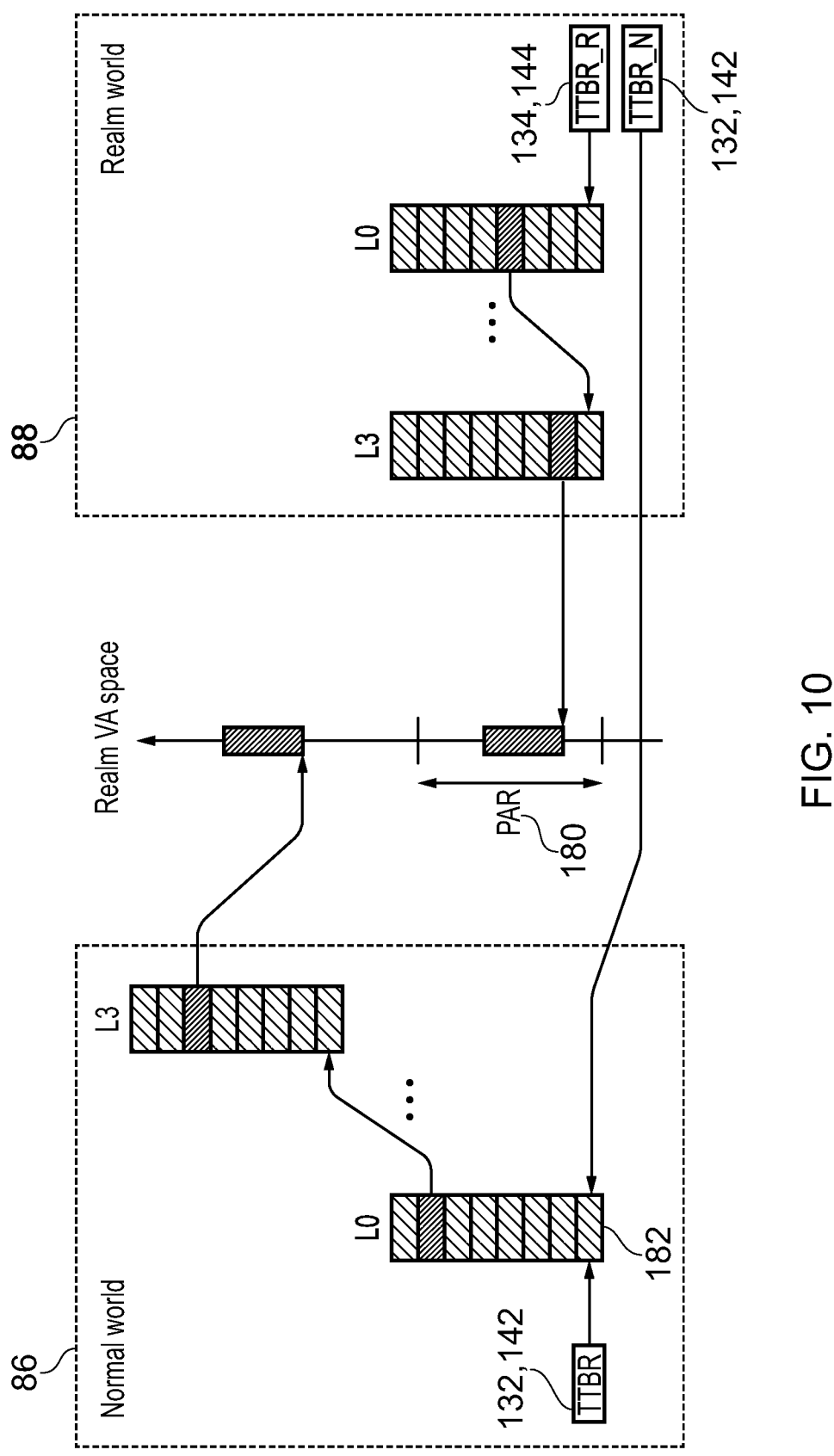
FIG. 10 illustrates selection between first/second translation table addresses depending on whether a virtual address to be translated is in a protected region of virtual address space.

FIG. 10 illustrates how translations are handled from the normal (non-secure) domain 86 and the realm domain 88. For non-secure domain accesses, the TTBR used for pointing to the level 0 page table is S1_TTBR_N 132 for stage 1 and S2_TTBR_N 142 for stage 2 (for conciseness, FIG. 10 only shows a single stage of translation, which could be either stage 1 or stage 2).

For realm domain accesses, if the VA is within the PAR 180, then S1_TTBR_R 134 provides the level 0 page table base address for stage 1 and S2_TTBR_R 144 provides the level 0 page table base address for stage 2. If the VA is outside the PAR 180, then S1_TTBR_N 132 is used to provide the L0 base address for stage 1 and S2_TTBR_N 142 provides the level 0 page table base address for stage 2, so that this points to the same L0 stage 1 or stage 2 page table 182 used by the normal world 86. This is helpful for implementing the EL0 realm 42 shown in FIG. 2, allowing the EL0 realm (R0) 42 to share the non-secure address space of the enclosing application 30 in the non-secure domain transparently, with reduced software input.

That is, a normal EL0 application 30 may have a virtual address space provided by its operating system 32, e.g. 1 GB in size starting at address 0 for instance. An EL0 realm 42 may be defined as having a protected address range (PAR) 180 that is a subset of the application's virtual address space, e.g. 128 MB in size starting at a chosen offset address, e.g. 512 MB. Memory within the Realm PAR 180 should be inaccessible to the other parts of the EL0 application 30 (or other agents). For the R0 realm 42, its private memory exists within the protected address region 180 and it shares data with the rest of the application 30 by having direct read/write access to the non-PAR application virtual memory outside the PAR 180.

Implementing a PAR carveout using existing virtual memory techniques and MMUs is possible, e.g. using shadow page tables where the realm maintains a separate page table structure duplicating the non-secure domain's page table structure. However, this requires good co-ordination between the controlling parties (e.g. synchronising page table updates and TLB invalidations, which may require trapping or para-virtualisation of these operations). These measures can have performance impact on unrelated code. Also, duplicating page table structures wastes memory storage capacity. Also, in an adversarial environment (where there is no trust between entities as described above), this co-operation between entities cannot be depended upon. Realm security guarantees (confidentiality and integrity) cannot depend on the goodwill of other parties.

These problems can be addressed using the "PAR overlay" technique illustrates in FIG. 10, which provides a mechanism to implement the PAR region(s) 180 with separate address translation data while reusing the existing page table structures for accesses outside the PAR region 180. Hence, non-secure page tables are shared with the realm domain, and the realm domain has access to (at least) two TTBRs, TTBR_R 134, 144 which points to the realm "overlay" page table structure and TTBR_N 132, 142 which is shared with non-secure domain and points to the "underlay" page table structure. This approach means that the Realm code cannot access the physical addresses mapped by the non-secure page tables to virtual addresses in the range corresponding to the PAR region 180, while the Non-secure code can access these physical addresses. To maintain security, it may be desirable for Realm code, if making an access to a virtual address depending on a parameter passed by the Non-secure code, to check the address to check whether it lies within the PAR region 180, before triggering a memory access conditional on the address being outside the PAR region. Otherwise, the Realm code could be tricked into accessing its own internal data within the physical addresses mapped to the PAR region 180 by the Realm page tables, under control of a parameter passed from Non-secure code, which could be a security risk. For example, the Realm code could be requested to walk a data structure mapped to the underlay range of the PAR region by the Non-secure page tables, but where those virtual addresses when accessed in the Realm domain would cause the Realm code to access physical addresses storing sensitive information to be protected against access by the Non-secure domain—this can be prevented by first sanitising the address. This sanitising address check may not be enforced by any architectural feature of the processor (it is a check recommended to be performed by software for security, but it is not a feature implemented as a hardware feature of the processor).

Alternatively, instead of reusing the same physical register TTBR_N 132 to provide the base address for the realm domain "underlay" accesses outside the PAR 180, a second realm domain TTBR 138, 148 (S1_TTBR_R2 or S2_TTBR_R2) could be provided and used by the realm domain when the VA is outside the PAR 180. In this case, there is more flexibility as the address stored to S1/S2_TTBR_R2 138, 148 could be updated either to match the address stored in S1/S2_TTBR_N 132, 142 or to specify a different address if a different page table structure is to be accessed by the EL0 realm (R0) 42.

Figure 11:
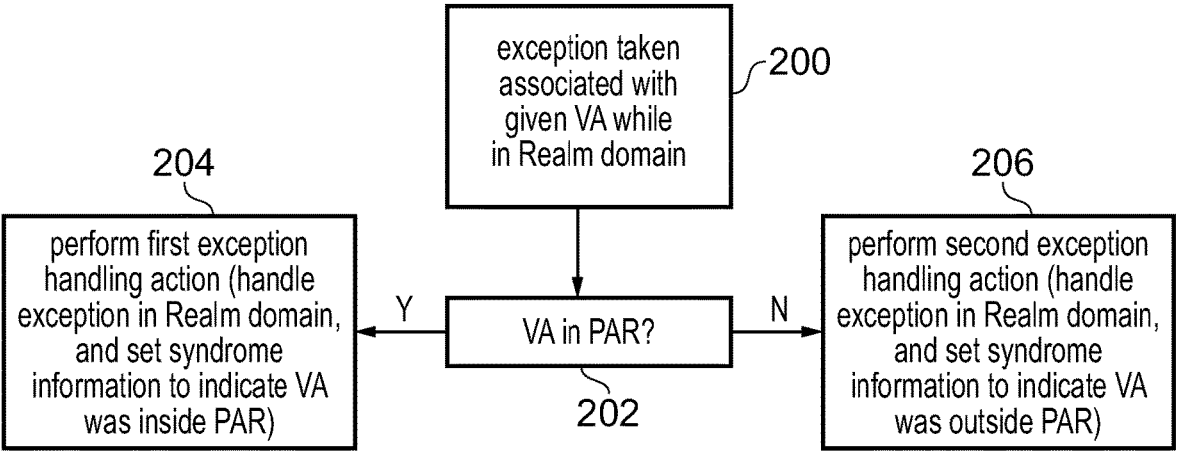
FIG. 11 illustrates exception handling in the realm domain.

FIG. 11 shows a method of handling exceptions occurring in the realm domain 86. At step 200, an exception is taken from the realm domain. The exception is associated with a given VA. For example, the exception could be an address fault signalled when an attempt to perform an address translation for an instruction fetch, data access or page table walk access finds that there is no address translation mapping defined in the page table structures for that VA or that the access permissions prohibit the memory access requested. Also, the exception could be caused by the PAS filter 20 rejecting a memory access.

At step 202 it is determined whether the given VA is in the PAR 180 defined by PAR register 130. If so, then at step 204 a first exception handling action is performed, for example the exception is handled in the realm domain 88 and syndrome information is set to indicate that the VA was within the PAR 180. If the given VA is outside the PAR 180, at step 206 a second exception handling action is performed, for example the exception is handled in the realm domain, and the syndrome information is set to indicate that the VA was outside the PAR 180. The exception handler executed in the realm domain in response to the exception may then use the syndrome information to determine how to handle the exception. If the VA was inside the PAR 180 then the exception handler may itself deal with the cause of the fault. If the VA was outside the PAR 180, then the exception handler may forward the exception to the Non-Secure domain and a Non-secure exception handler may then deal with the cause of the fault. This is useful as if the fault is associated with translation data defined by code in the non-secure domain due to the realm domain sharing the non-secure domain's page table structures, then that exception may be better handled by an exception handler associated with the OS 32 or hypervisor 34 in the non-secure domain.

An alternative approach could be that the first exception handling action at step 204 could comprise handling the exception in the Realm domain, while the second exception handling action at step 206 could comprise handling the exception in the Non-Secure domain. In this case, the exception handling circuitry may directly cause the exception to be taken in the Realm domain or Non-Secure domain depending on whether the VA was in the PAR or not.

However, if at the point of taking the exception there is state stored in registers 12 that could be sensitive and should be protected against access by the Non-Secure domain, it may be preferred to use the approach shown in FIG. 11 where any exception occurring in the Realm domain is initially taken to the Realm domain, before the Realm software exception handler can then choose to forward it to the Non-Secure domain if necessary. This would allow the Realm software exception handler to initiate state saving operations to save to memory the subset of register state 12 that should be protected against Non-Secure access, and overwrite the contents of those registers 12, before forwarding the exception to the Non-Secure domain.

Figure 12:
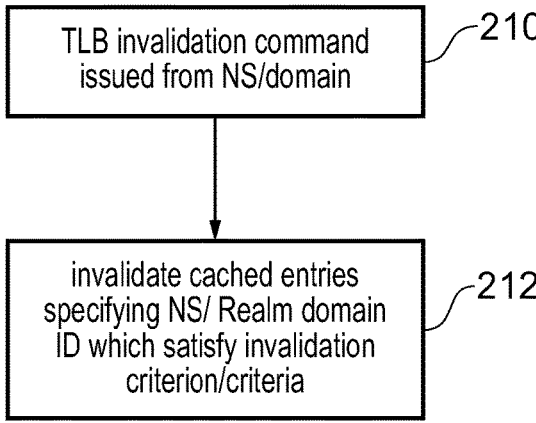
FIG. 12 illustrates processing of a TLB invalidation command issued from the less secure domain.

FIG. 12 shows a method of handling TLB invalidation commands issued when the processing circuitry is in the non-secure domain 86. At step 210 the TLB invalidation command is issued. The TLB invalidation command causes the TLB 18 to look up whether it has any valid entries which satisfy any invalidation criterion or criteria specified by the TLB invalidation command (e.g. these criteria could specify a VA or VA range for which invalidations are to be carried out). When the TLB invalidation command is issued from the non-secure domain, then at step 212 the TLB invalidates any cached entries which satisfy invalidation criterion/criteria and which specify a domain identifier tag indicating either the non-secure domain or the realm domain. In contrast, for TLB invalidations issued from one of the root domain, secure domain or realm domain, the TLB invalidation command may cause TLB entries whose domain identifier tag specifies that particular domain, but not other domains. As the realm domain may have caused entries to be cached in the TLB 18 which provide information derived from non-secure domain page tables, then when those non-secure page tables are updated, any out of date data from such page tables should be flushed from the TLB 18 even if it was allocated by the realm domain, so this is why it is useful for TLB invalidations to cause invalidation of realm domain TLB entries as well as non-secure domain TLB entries.

As mentioned above, the use of two separate TTBRs 132, 134 can be useful for EL0 realms 42 which represent a secure enclave within an EL0 application 30 running in the non-secure domain 86. However, as shown in FIG. 2 the realm domain 88 could also support encapsulated EL0/EL1 realms 44 (e.g. realm R1 shown in FIG. 2) which run both the application level code at EL0 and the corresponding operating system at ED within the realm domain. For such EL0/EL1 realms 44, the PAR register 130 and TTBR_N register 132 do not need to be used, as a single L0 base address could be used for the entire virtual address space accessed by a EL0/EL1 realm. Hence, for such combined EL0/EL1 realms 44, it is not necessary to compare the VA with the PAR defining data to decide which TTBR to use for page table walks.

Hence, it is not essential for all realm domain accesses to use the realm "overlay" technique shown above. In some cases, some configuration information specified in a control register may specify whether realm domain accesses should use a single TTBR for obtaining the L0 base address for stage 1 page table walks regardless of whether the VA is in the PAR or not, or whether they should select the TTBR based on a comparison of the VA and the PAR.

Figure 13:
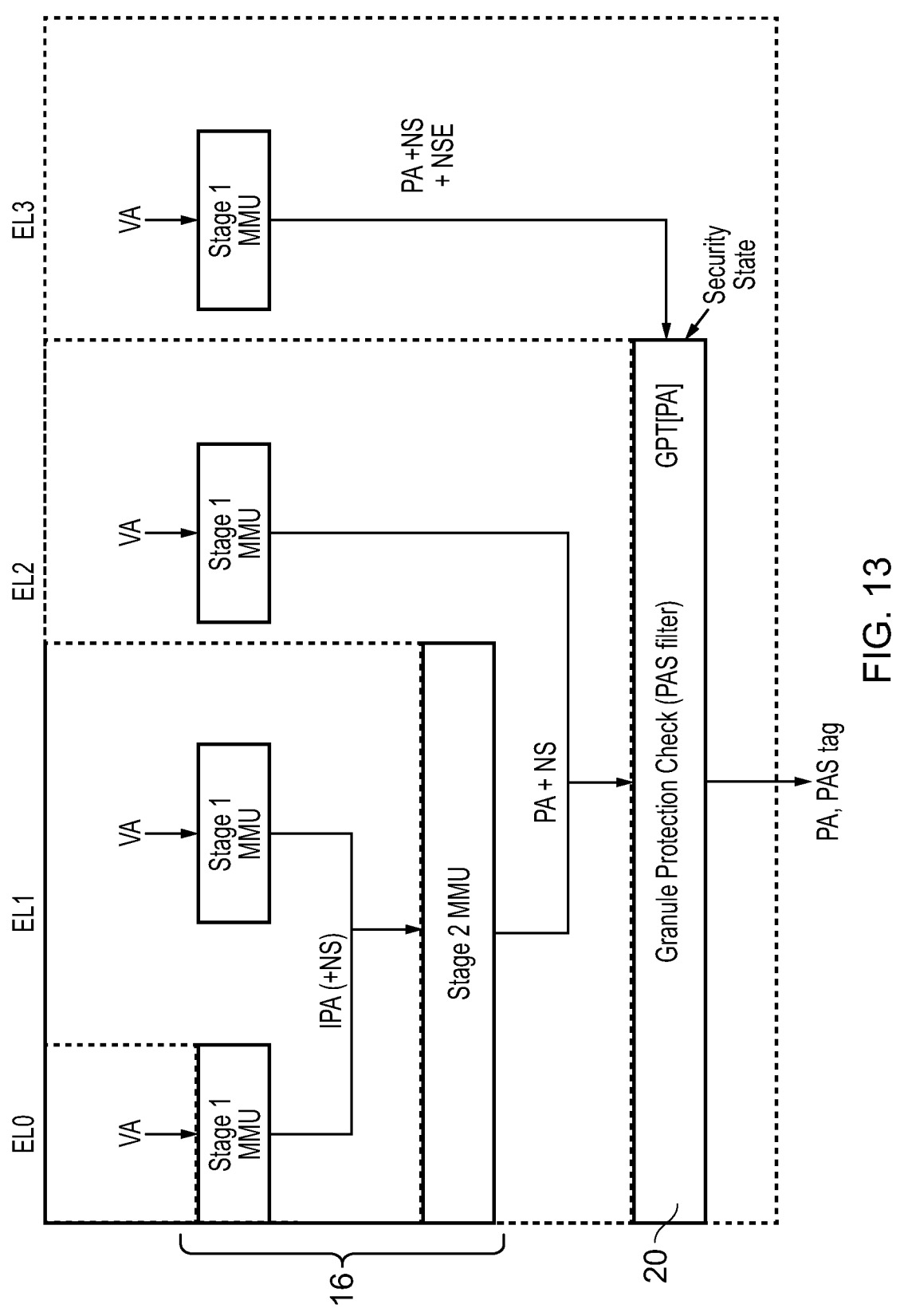
FIG. 13 illustrates a number of stages of address translation and granule protection information filtering.

FIG. 13 summarises the operation of the address translation circuitry 16 and PAS filter. The PAS filtering 20 can be regarded as an additional stage 3 check performed after the stage 1 (and optionally stage 2) address translations performed by the address translation circuitry. The stage 1 translations provide PAS selection information "NS" (based on the leaf entries accessed in stage 1 page table structures selected based on the TTBRs as described above) which controls whether an access from the realm or secure domains accesses the PAS associated with that domain or the non-secure PAS. Accesses from the non-secure domain access the non-secure PAS regardless of any PAS selection. For accesses from the root domain in EL3, the stage 1 page table entries provide two bits of address based selection information (labelled NS, NSE) which together encode which of the four PASs shown in FIG. 4 should be selected for a given root domain memory access. The PAS filter 20 performs the granule protection check based on the selected PAS, the current "Security state" (i.e. domain ID identifying the current domain) and information in the granule protection table (GPT) described above, to determine whether the access should proceed.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400 may be executed from within the instruction execution environment using the simulator program 410, so that a host computer 430 which does not actually have the hardware features of the apparatus 2 discussed above can emulate these features. This can be useful, for example, for allowing testing of target code 400 being developed for a new version of a processor architecture before hardware devices actually supporting that architecture are yet available, as the target code can be tested by running within the simulator executing on a host device which does not support that architecture.

The simulator code includes processing program logic 412 which emulates the behaviour of the processing circuitry 10, e.g. including instruction decoding program logic which decodes instructions of the target code 400 and maps the instructions to corresponding sequences of instructions in the native instruction set supported by the host hardware 430 to execute functions equivalent to the decoded instructions. The processing program logic 412 also simulates processing of code in different exception levels and domains as described above. Register emulating program logic 413 (an example of state emulating logic) maintains a data structure in a host address space of the host processor, which emulates architectural register state defined according to the target instruction set architecture associated with the target code 400. Hence, instead of such architectural state being stored in hardware registers 12 as in the example of FIG. 1, it is instead stored in the memory of the host processor 430, with the register emulating program logic 413 mapping register references of instructions of the target code 400 to corresponding addresses for obtaining the simulated architectural state data from the host memory. This architectural state may include the current domain indication 14 and current exception level indication 15 described earlier, as well as the various translation table addresses corresponding to the TTBRs 132-148 and the region defining data corresponding to the PAR register 130 as described earlier.

The simulation code includes address translation program logic 414 and filtering program logic 416 which emulate the functionality of the address translation circuitry 16 and PAS filter 20 respectively, with reference to the same page table structures and GPT 56 as described earlier. Hence, the address translation program logic 414 translates virtual addresses specified by the target code 400 into simulated physical addresses in one of the PASs (which from the point of view of the target code refer to physical locations in memory), but actually these simulated physical addresses are mapped onto the (virtual) address space of the host processor by address space mapping program logic 415. The filtering program logic 416 performs a lookup of granule protection information to determine whether to allow memory accesses triggered by the target code to proceed, in the same way as the PAS filter described above. The address translation program logic 414 selects the TTBR 132, 134, 142, 144 to use for realm domain accesses based on whether the target VA to be translated is in the PAR, as described earlier.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
address translation circuitry configured to translate a target virtual address specified by a memory access request into a target physical address;
first translation table address storage circuitry configured to store a first translation table address;
second translation table address storage circuitry configured to store a second translation table address; and
protected region defining data storage circuitry configured to store region defining data specifying at least one protected region of virtual address space; in which:
in response to the memory access request, the address translation circuitry is configured to:
in response to the target virtual address being in the at least one protected region of virtual address space, translate the target virtual address based on address translation data from a first translation table structure identified by the first translation table address stored in the first translation table address storage circuitry; and
in response to the target virtual address being outside the at least one protected region of virtual address space, translate the target virtual address based on address translation data from a second translation table structure identified by the second translation table address stored in the second translation table address storage circuitry.

2. The apparatus according to claim 1, comprising at least one translation lookaside buffer configured to cache information derived from address translation data from one or more translation table structures; in which:
in response to a memory access request which misses in the at least one translation lookaside buffer, the address translation circuitry is configured to:
determine whether the target virtual address of the memory access request is in the at least one protected region of virtual address space specified by the region defining data; and
perform a page table walk operation using:
the first translation table address stored in the first translation table address storage circuitry when the target virtual address is in the at least one protected region; and
the second translation table address stored in the second translation table address storage circuitry when the target virtual address is outside the at least one protected region.

3. The apparatus according to claim 1, comprising processing circuitry configured to perform data processing in one of a plurality of domains of operation, in which:

when the processing circuitry is in a first domain, the address translation circuitry is configured to translate the target virtual address using address translation data from one of the first translation table structure and the second translation table structure depending on whether the target virtual address is in the at least one protected region.

4. The apparatus according to claim 3, in which when the processing circuitry is in a second domain, the address translation circuitry is configured to translate the target virtual address based on address translation data from a translation table structure identified by a translation table address obtained from a storage location selected independent of a determination of whether the target virtual address is in or outside the at least one protected region.

5. The apparatus according to claim 4, in which when the processing circuitry is in the second domain, the address translation circuitry is configured to obtain the translation table address from the second translation table address storage circuitry.

6. The apparatus according to claim 4, comprising further translation table address storage circuitry to store a further translation table address; in which:

when the processing circuitry is in the second domain, the address translation circuitry is configured to obtain the translation table address from the further translation table address storage circuitry.

7. The apparatus according to claim 3, comprising exception handling circuitry configured to control handling of exceptions; in which:

for at least one type of exception occurring for processing in the first domain, in response to an exception of said at least one type associated with a given virtual address, the exception handling circuitry is configured to:

perform a first exception handling action, when the given virtual address is in the at least one protected region; and perform a second exception handling action different from the first exception handling action, when the given virtual address is outside the at least one protected region.

8. The apparatus according to claim 7, in which the first exception handling action comprises setting syndrome information to indicate that the exception is associated with a virtual address in the at least one protected region; and the second exception handling action comprises setting the syndrome information to indicate that the exception is associated with a virtual address outside the at least one protected region.

9. The apparatus according to claim 7, in which the first exception handling action comprises triggering handling of the exception in the first domain; and the second exception handling action comprises triggering handling of the exception in a second domain.

10. The apparatus according to claim 3, comprising at least one translation lookaside buffer comprising buffer entries to cache information derived from address translation data from one or more translation table structures, each buffer entry associated with a domain identifier identifying a corresponding one of the plurality of domains; in which:

in response to a translation invalidation command issued when the processing circuitry is in a second domain, the at least one translation lookaside buffer is configured to:

invalidate buffer entries for which at least one invalidation criterion specified by the translation invalidation command is satisfied and the domain identifier identifies the first domain, and invalidate buffer entries for which the at least one invalidation criterion is satisfied and the domain identifier identifies the second domain.

11. The apparatus according to claim 3, in which the address translation circuitry is configured to translate the target virtual address to the target physical address in one of a plurality of physical address spaces selected based at least on a current domain of the processing circuitry.

12. The apparatus according to claim 11, in which the plurality of physical address spaces comprise at least a first physical address space associated with the first domain and a second physical address space associated with a second domain;

the first physical address space is accessible from the first domain and inaccessible from the second domain; and the second physical address space is accessible from both the first domain and the second domain.

13. The apparatus according to claim 12, in which the plurality of physical address spaces also comprise a third physical address space associated with a third domain; and the third physical address space is accessible from the third domain and inaccessible from the first domain and the second domain.

14. The apparatus according to claim 12, in which when the processing circuitry is in the third domain, the address translation circuitry is configured to translate the target virtual address based on address translation data from a translation table structure identified by a translation table address obtained from a storage location selected independent of a determination of whether the target virtual address is in or outside the at least one protected region.

15. The apparatus according to claim 14, comprising third translation table address storage circuitry configured to store a third translation table address; in which:

when the processing circuitry is in the third domain, the address translation circuitry is configured to obtain the translation table address from the third translation table address storage circuitry.

16. The apparatus according to claim 1, in which, for each protected region of said at least one protected region, the region defining data specifies a base address of the protected address region and a size of the protected address region.

17. The apparatus according to claim 1, in which the address translation circuitry is configured to perform a two-stage address translation based on a first-stage translation table structure specifying mapping from the target virtual address to a target intermediate address and a second-stage translation table structure specifying mapping from the target intermediate address to the target physical address;

the address translation circuitry is configured to obtain a first-stage translation table address identifying the first-stage translation table structure from one of the first translation table address storage circuitry and the second translation table address storage circuitry selected based on a determination of whether the target virtual address is in or outside the at least one protected region; and the address translation circuitry is configured to obtain a second-stage translation table address identifying the second-stage translation table structure from one of first second-stage translation table address storage circuitry and second second-stage translation table address storage circuitry selected based on a determination of whether the target virtual address is in or outside the at least one protected region.

18. A non-transitory computer-readable storage medium storing a computer program for controlling a host data processing apparatus to provide an instruction execution environment for execution of target code; the computer program comprising:

address translation program logic to translate a target virtual address specified by a memory access request into a target physical address; and state emulating logic to maintain state information emulating architectural state of a target instruction set architecture associated with the target code, the state information specifying:

a first translation table address;

a second translation table address; and region defining data specifying at least one protected region of simulated virtual address space; in which:

in response to a memory access instruction of the target code, the address translation program logic is configured to:

in response to the target virtual address being in the at least one protected region of simulated virtual address space, translate the target virtual address based on address translation data from a first translation table structure identified by the first translation table address; and in response to the target virtual address being outside the at least one protected region of simulated virtual address space, translate the target virtual address based on address translation data from a second translation table structure identified by the second translation table address.

* * * * *